(12) United States Patent  (10) Patent No.: US 7,249,779 B2
Ehrenreich et al.  (45) Date of Patent: Jul. 31, 2007

(54) CONVERTIBLE STROLLER/TRICYCLE

(75) Inventors: Michael Ehrenreich, South Orange, NJ (US); Joel Hoag, Brooklyn, NY (US)

(73) Assignee: Soma Cycle, Inc., South Orange, NJ (US)

( * ) Notice: Subject to any disclaimer, the term of this patent is extended or adjusted under 35 U.S.C. 154(b) by 0 days.

(21) Appl. No.: 11/133,385

(22) Filed: May 20, 2005

(65) Prior Publication Data
US 2006/0261575 A1  Nov. 23, 2006

(51) Int. Cl.
B62K 1/00 (2006.01)
(52) U.S. Cl. .................. 280/643; 280/87.05; 280/278
(58) Field of Classification Search ............ 280/7.17, 280/30, 7.15, 7.1, 1.188, 210, 648, 658, 1.12, 280/1.13, 642, 643, 259, 261, 278, 287, 87.041, 280/87.042, 829, 47.38, 62, 47.18, 638
See application file for complete search history.

(56) References Cited

U.S. PATENT DOCUMENTS

| 1,218,943 | A | * | 3/1917 | Hudry ................. 280/7.17 |
| 1,347,384 | A | * | 7/1920 | Kinnard .................. 280/7.1 |
| 1,408,729 | A | * | 3/1922 | Green ................. 280/47.35 |
| 1,560,288 | A | * | 11/1925 | Murvay ................. 280/30 |
| 2,305,719 | A | * | 12/1942 | Lee ...................... 280/7.1 |
| 2,435,733 | A | * | 2/1948 | Belyeu ................... 280/30 |
| 2,468,933 | A | | 5/1949 | Jones |
| 2,798,727 | A | * | 7/1957 | Viggo et al. ............ 280/7.17 |
| 3,314,494 | A | * | 4/1967 | Weitzner ................ 180/208 |
| 3,738,700 | A | * | 6/1973 | Terry .................... 296/97.21 |
| 3,954,283 | A | * | 5/1976 | Boehm et al. ........... 280/273 |
| 4,015,297 | A | * | 4/1977 | Christian ................... 5/97 |
| 4,825,484 | A | * | 5/1989 | Riegel ..................... 5/97 |
| 4,958,842 | A | * | 9/1990 | Chang .................... 280/7.1 |
| 5,125,674 | A | * | 6/1992 | Manuszak ................ 280/30 |
| 5,190,306 | A | * | 3/1993 | Nauman et al. .......... 280/202 |
| 5,558,357 | A | | 9/1996 | Wang |
| 5,562,300 | A | | 10/1996 | Nelson |
| 5,590,896 | A | | 1/1997 | Eichhorn |
| 5,692,760 | A | * | 12/1997 | Pickering ................ 280/7.17 |
| 5,709,400 | A | * | 1/1998 | Bonnier et al. .......... 280/650 |
| 5,820,146 | A | * | 10/1998 | Van Ligten ........... 280/87.041 |
| 5,884,922 | A | * | 3/1999 | Pickering ................ 280/7.17 |
| 5,975,551 | A | * | 11/1999 | Montague et al. ........ 280/287 |
| 6,164,666 | A | | 12/2000 | Prea |
| 6,231,056 | B1 | * | 5/2001 | Wu ...................... 280/7.17 |
| 6,237,995 | B1 | * | 5/2001 | Dierickx ................. 297/130 |
| 6,340,168 | B1 | * | 1/2002 | Woleen .................. 280/643 |

(Continued)

Primary Examiner—Christopher Ellis
Assistant Examiner—Bridget Avery
(74) Attorney, Agent, or Firm—Arent Fox LLP

(57) ABSTRACT

A vehicle for carrying a child that is pushed along by one walking, jogging, or running, steerable with handlebars, and convertible from a push stroller to a rideable, operator-powered tricycle. The stroller converts from a stroller pushable from a back end to a tricycle by extending telescoping frame members and attaching a seat frame assembly comprising pedals, a crank, a continuous drive element, front and rear drive elements, and a first gear for driving a pair of rear wheels. Further, a child-carrying feature attaches at a front end to a frame support member and at a back end to a rotatable handlebar assembly. The stroller of the present invention also converts into a compact configuration for convenient transportation or storage by removing the seat frame assembly, retracting the telescoping frame members, and folding the handlebar assembly forward.

57 Claims, 29 Drawing Sheets

U.S. PATENT DOCUMENTS

| | | | |
|---|---|---|---|
| 6,409,190 B1 * | 6/2002 | Tsai | 280/87.041 |
| 6,460,866 B1 * | 10/2002 | Altschul et al. | 280/30 |
| 6,595,536 B1 * | 7/2003 | Tucker | 280/278 |
| 6,601,862 B2 * | 8/2003 | Kettler | 280/231 |
| 6,623,023 B2 * | 9/2003 | Niitsu et al. | 280/278 |
| 6,676,140 B1 * | 1/2004 | Gondobintoro | 280/33.993 |
| 6,688,614 B2 * | 2/2004 | Hsu | 280/37 |
| 7,029,015 B2 * | 4/2006 | Lin | 280/47.26 |
| 2001/0035626 A1 | 11/2001 | Kettler | |
| 2003/0151225 A1 | 8/2003 | Lopez | |

* cited by examiner

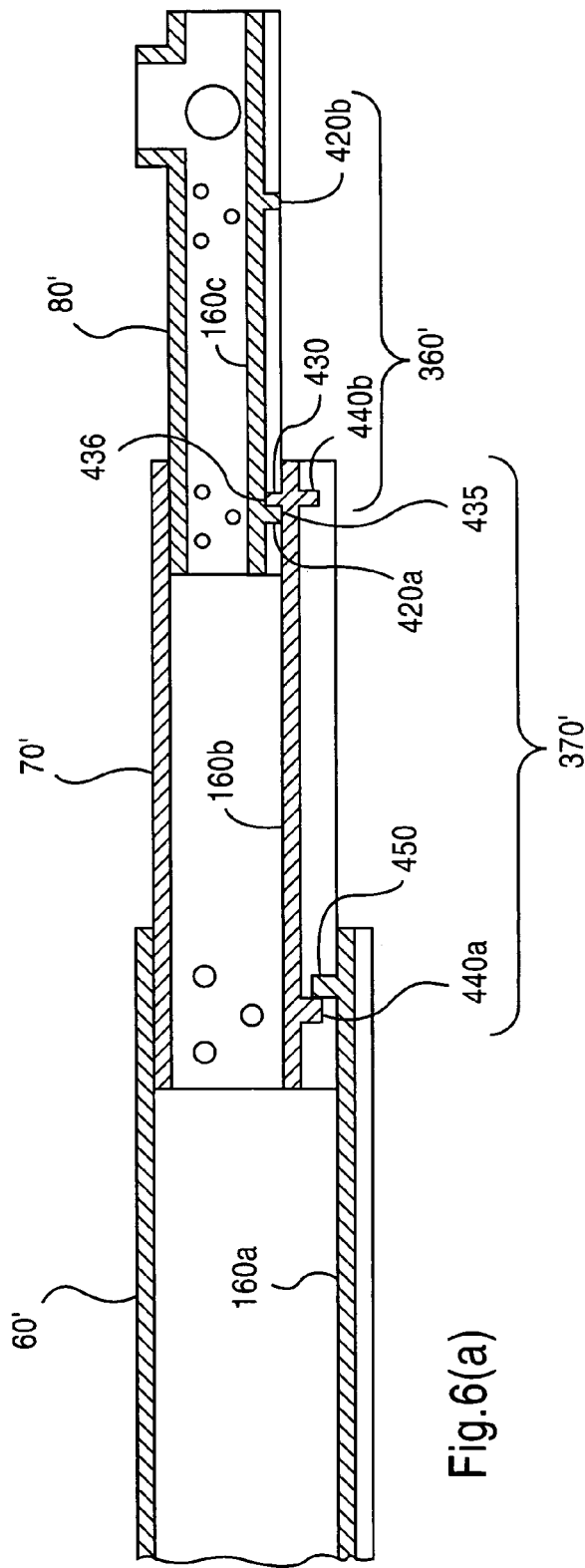
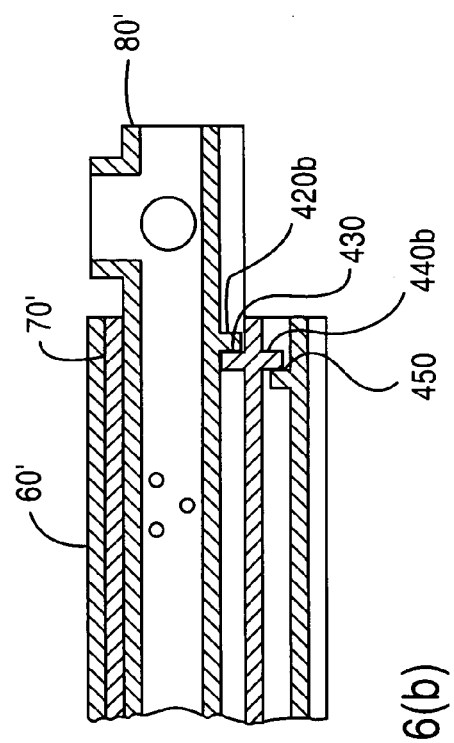
Fig.6(a)
Fig.6(b)

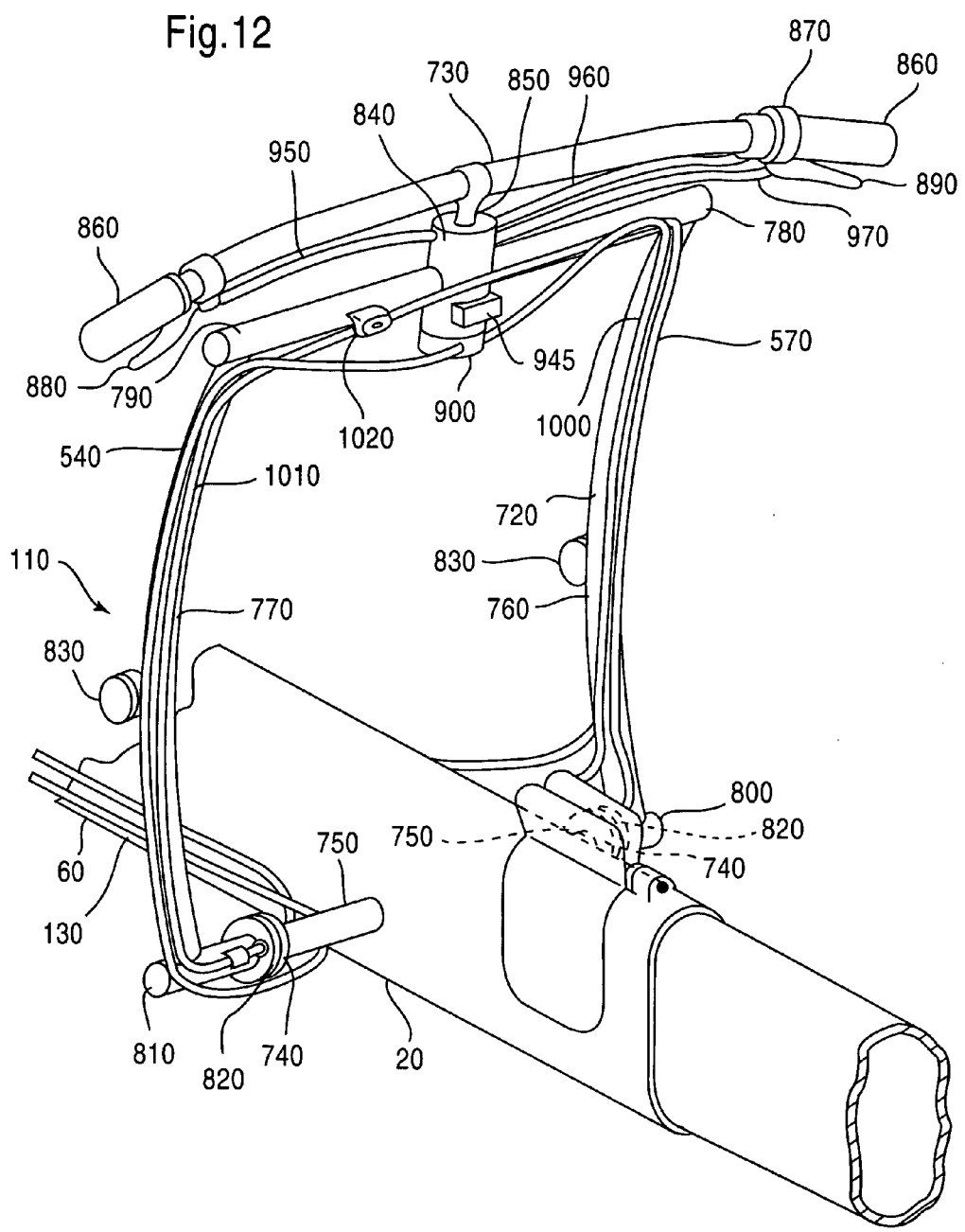

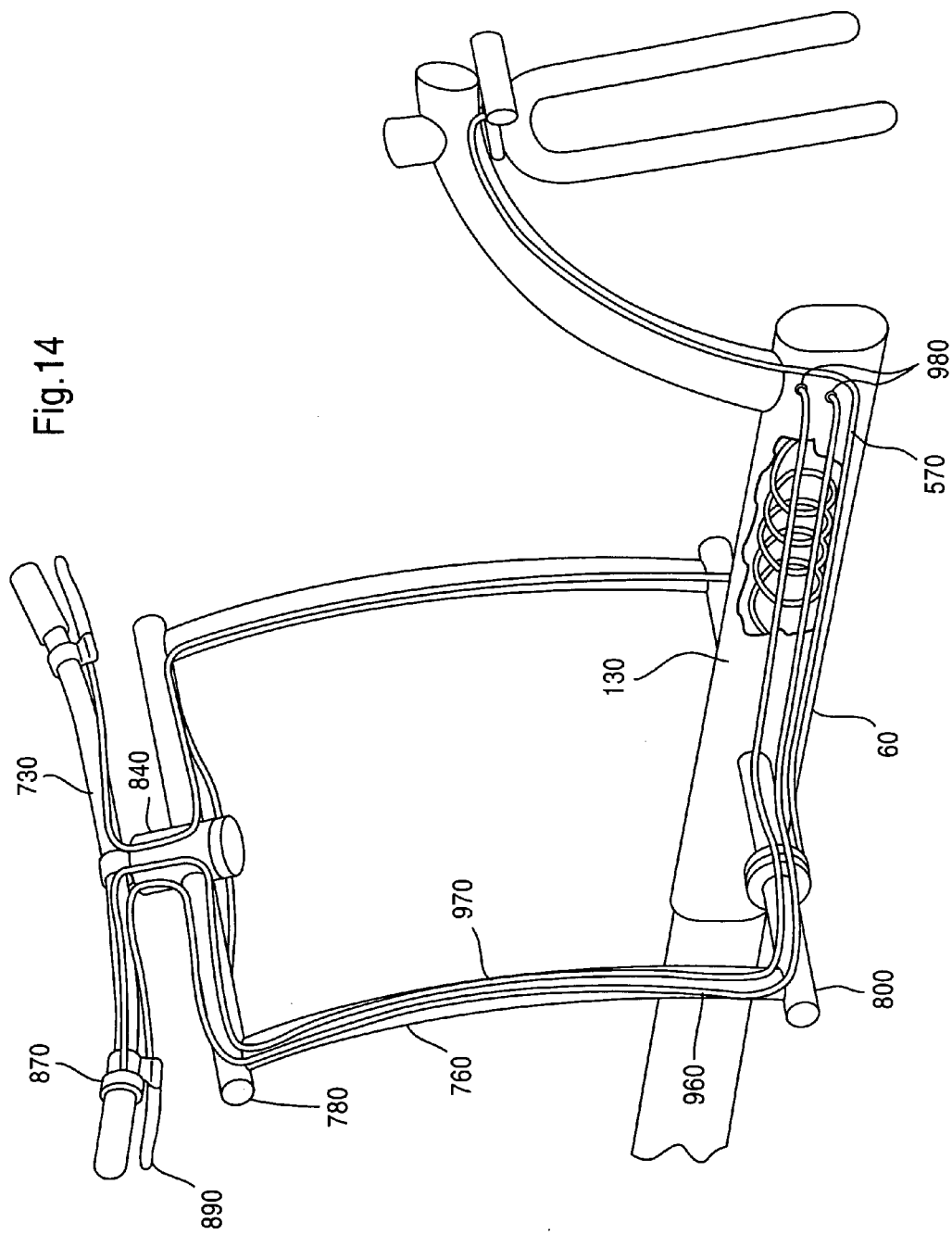

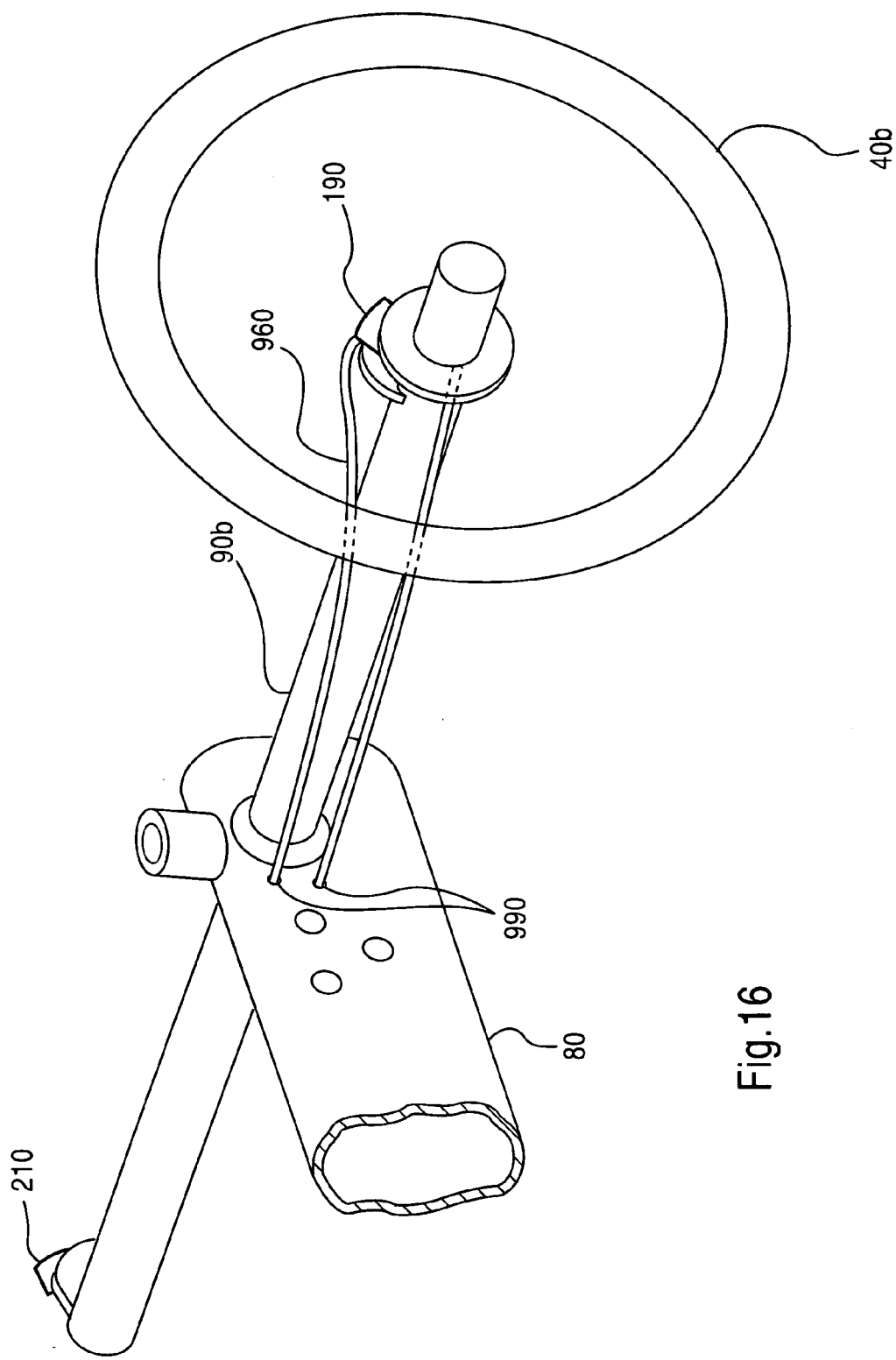

CONVERTIBLE STROLLER/TRICYCLE

BACKGROUND OF THE INVENTION

1. Field of the Invention

The present invention relates to a vehicle for carrying a child that is pushed along by one walking, jogging, or running, steerable with handlebars mounted on a pivoting handlebar assembly, and convertible from a push stroller to a rideable, operator-powered tricycle. More specifically, the invention relates to a stroller, which converts from a stroller to a tricycle by extending telescoping frame members and attaching a seat frame assembly comprising a drivetrain for driving at least one rear wheel. Additionally, the invention relates to a stroller, which converts into a compact configuration for convenient transportation or storage, by the removing the seat frame assembly, retracting the telescoping frame members and rotating the handlebar assembly forward.

2. Discussion of Related Art

Many child stroller designs and operator-powered bicycles and tricycles are well-known in the art. One such stroller design is disclosed in U.S. Pat. No. 5,590,896 to Eichhorn.

Eichhorn discloses a three-wheeled collapsible stroller having a front wheel assembly 320 that is selectively lockable into a straight-ahead position. The stroller includes independently removable rear wheels 260 and 270 and brake mechanisms for preventing rotation of the rear wheels 260 and 270. A fabric seat assembly 800, for carrying a child, is supported between a handle tube 20 and front tubes 40 and 45. A seatback 801 of the seat assembly 800 can be oriented in an upright or reclined position. In the fully extended, unfolded configuration, optional spring-loaded latch handles 140 and 150 operate to lock the stroller into the unfolded configuration. When converted into the collapsed configuration, the handle tube 20 rotates downwardly, causing front tubes 40 and 45 to rotate downwardly, thereby bringing the front wheel assembly 320 towards the rear wheels 260 and 270.

A second stroller device is disclosed in U.S. Pat. No. 5,558,357 to Wang. Wang discloses a foldable three-wheeled trolley that can accommodate a seat for carrying a baby between a pair of push members 60. The trolley includes a straight main body 10, a slide member 20 slideable thereon, a fork 11 at a front end, and two transverse axle units 50 at a back end. The slide member 20 connects to back ends of a pair of support rods 60 via a U-shaped member 30 pivotably connected at both ends. When reconfiguring the trolley for transport or storage, the slide member 20 slides forward along the main body 10, rotating support rods 60 downward and the transverse axle units 50 forward and retracting rear wheels 54 alongside main body 10.

U.S. Pat. No. 5,562,300 to Nelson discloses a stroller having a tricycle configuration capable of carrying at least one child safety seat. The stroller has foldable right and left handlebars 40 and 42 attached at a back end of parallel right and left longitudinal frame members 30 and 32. A front wheel 12 removably attaches between frame members 30 and 32 at their respective front ends. The stroller also includes parallel first and second lateral members 18 and 20 having V-shaped end members 22 at opposing ends thereof to which main wheels 14 and 16 removably attach. The first and second lateral members 18 and 20, along with right and left lateral seat latch attachment rods 48 and 50, provide for mounting at least one child seat thereto.

U.S. Patent Application Publication No. US 2001/0035626 A1 to Kettler discloses a tricycle comprising a front frame 6, a rear frame 1, and an intermediate frame 12. The front frame 6 includes a handlebar 8, a front wheel 10, pedals 22 for driving the front wheel 10, and an inner telescopic tube 17 at a back end. The rear frame 1 includes a first seat 5, an outer telescopic tube 16, and a rear axle 2 with rear wheels 3 and 4 mounted at opposing ends thereof. The inner telescopic tube 17 of the front frame 6 is slideable into the outer telescopic tube 16 of the rear frame and can be locked at different positions therein. The intermediate frame 12 includes a second seat 13, lateral foot rests 15, a holding element 14, an outer telescopic tube 16 at a front end, and an inner telescopic tube 17 at a back end. In an alternate configuration, the inner telescopic tube 17 of the front frame 6 is slideable into the telescopic tube 16 of the intermediate frame 12 land lockable at several positions therein, while the outer telescopic tube 16 of the intermediate frame 12 is slideable over the inner telescopic tube 17 of the rear frame 1, and is also lockable at several positions therein. Therefore, Kettler discloses a tricycle that can be lengthened to accommodate a second rider by inserting the intermediate frame 12 between the front and rear frames 6 and 1. Additionally, the tricycle's length can be varied depending on the locking position(s) of the inner telescopic tube(s) 17 within the outer telescopic tube(s) 16.

U.S. Pat. No. 6,164,666 to Prea discloses a bicycle convertible into a tricycle and vice versa. In the tricycle configuration, an axle 9, having both a tricycle axle 36 and a bicycle axle 37, mounts to a back end of a single-beam arm 13. In the bicycle configuration, the bicycle axle 37 is detached from the tricycle axle 36 and mounted to the back end of the single-beam arm 13, wherein a wheel 8 mounted at an end of the bicycle axle 37 opposite the single-beam arm 13 longitudinally aligns with a steerable front wheel 3. The bicycle also includes a seat 1, handlebars 2, a frame 4, and pedals 5 and 6.

Next, U.S. Patent Application Publication No. US 2003/0151225 to Lopez discloses a tricycle having a single tube frame with a front portion 40 and a rear portion 44. Adjustable handlebars 37, a front fork 42, and a front wheel 26 attach to a front end of the frame while foldable brackets 48 and a foldable seat 72 mount at a back end thereof. A rotatable pedal crank mounts to a bracket 47 extending from the front fork 42 for driving the front wheel 26 via a continuous chain 32. The foldable brackets 48 pivotably attach to the rear portion 44 at one end and pivotably attach to a bracket 64 at an opposing end. A rear wheel 25 attaches to an outer end of each bracket 64. By releasing pin 62 from a mating plate 61, the brackets 48 fold forwards, collapsing the foldable seat 72, while rear wheels 25 remain substantially parallel due to hinged brackets 64. The tricycle alternately includes an intermediate member disposed between the front portion 40 and rear portion 44 lengthening the tricycle and providing a tandem seating arrangement for 2 passengers.

Finally, U.S. Pat. No. 2,468,933 to Jones discloses a two-wheeled vehicle that is convertible from a two-wheeled scooter to a bicycle and vice versa. The vehicle is essentially a push scooter including a frame 13, rear and front wheels 1 and 2, a footrest 16 disposed between longitudinal extending frame tubes 14 and 15, and adjustable handlebars 5b for steering. Additionally, an arcuate-shaped support 25, including a seat 19, foot pedals 20 and 21, and a pulley 46, can easily be attached and removed from the frame 13, converting the vehicle from a two-wheeled scooter into a bicycle and vice versa. Once attached, a belt 47 slips onto the pulley 46 and a second pulley 45 for transferring the motion of the pedals 20 and 21 to the rear wheel 1 to drive the vehicle.

Although the related art described above discloses strollers having the capability to fold in a compact manner for storage or transportation, vehicles extendable by adding additional frame members, and vehicles convertible from a two-wheeled orientation to a three-wheeled orientation, the related art fails to disclose a vehicle convertible from a steerable, pushable stroller for carrying a child to a rideable, operator powered tricycle by extending telescoping frame members and attaching a seat post and pedal assembly thereto.

SUMMARY OF THE INVENTION

According to a first aspect of the present invention, the invention is a vehicle for pushing or riding having a frame with at least one inner member nested within an outer member. The at least one inner member telescopingly extends from and retracts into the outer member between a fully extended state and a fully retracted state, respectively. The vehicle also includes at least one front wheel operationally connected to a first end of the frame and at least one back wheel operationally connected to a second end of the frame opposite the first end. The vehicle is operable as a user rideable vehicle when the at least one inner member is in the fully extended state and is operable as a user pushable vehicle when the at least one inner member is in the fully retracted state. The frame also includes a locking device for securing the at least one inner member in the fully extended state or the fully retracted state.

The frame also includes at least one stopping mechanism included on one of an upper portion or lower portion of the outer member and a corresponding upper portion or lower portion of the at least one inner member to place the at least one inner member in either one of the fully extended state and the fully retracted state. According to one embodiment of the stopping mechanism, the stopping mechanism includes a pin extending from one of the upper portion or the lower portion of the outer member and which is slideable within a slot formed in the corresponding upper portion or the lower portion of the at least one inner member. The pin engages a first edge of the at least one inner member defining a first end portion of the slot to place the at least one inner member in the fully extended state. When the pin engages a second edge of the at least one inner member defining a second end portion of the slot opposite the first edge, the at least one inner member is placed in the fully retracted state.

According to a second embodiment of the stopping mechanism, the stopping mechanism includes a longitudinal ridge formed in one of the upper portion and the lower portion of the outer member nested within a longitudinal ridge formed in the corresponding upper portion or lower portion of the at least one inner member. The longitudinal ridge of the outer member and the longitudinal ridge of the at least one inner member are slideable over each other. Further, the stopping mechanism includes a first and second engaging pin extending from the longitudinal ridge of the at least one inner member at respective front and back ends thereof, and an engaging pin extending from a back end of the longitudinal ridge of the outer member. The first engaging pin of the at least one inner member engages the engaging pin of the outer member when the at least one inner member is in the fully extended state. The second engaging pin of the at least one inner member engages the engaging pin of the outer member when the at least one inner member is in the fully retracted state.

The vehicle further includes a detachable seat frame, wherein the seat frame is attachable to the frame when the at least one inner member is in the fully extended state. The seat frame additionally includes a releasable securing member for securing the seat frame to the frame when the at least one inner member is in the fully extended state. The seat frame also includes a seat adjustable to different heights to suit the needs of a user and a drivetrain for powering the vehicle.

The drivetrain includes at least one pulley, at least one belt, and at least one gear operationally connected to each other to power the vehicle. Alternately, the drivetrain may include at least one chainring, at least one chain, and at least one gear operationally connected to each other to power the vehicle.

According to a third aspect of the invention, the vehicle further includes a handlebar frame pivotably attached to the frame. The handlebar frame includes a handlebar steerably connected to a front member pivotably attached to a first end of the frame. The at least one front wheel is rotatably attached to the front member and pivots with the front member for steering the vehicle when the handlebar is pivoted relative to the frame.

According to a fourth aspect of the present invention, the handlebar is steerably connected to the front member by a first cable and a second cable extending between a first flange securably attached to the handlebar and rotatable therewith and a second flange securably attached to the front member and rotatable therewith. The first cable is slackened and the second cable is pulled when the handlebar is rotated in a first direction to steer the vehicle in the first direction, and the first cable is pulled and the second cable is slackened when the handlebar is rotated in a second direction to steer the vehicle in the second direction.

The handlebar frame also includes at least one control device for actuating at least one of a front brake and a brake and a gear adjustor for changing a gear ratio of the drivetrain of the vehicle. Further, the handlebar frame includes a locking mechanism to releasably lock the handlebar frame into an upright orientation relative to a longitudinal axis of the frame.

According to a fifth aspect of the invention, the drivetrain includes an internal gear hub for changing the gear ratio of the vehicle.

According to a sixth aspect of the invention, the drivetrain includes a derailleur for changing the gear ratio of the vehicle.

The vehicle further includes a child carrier disposed between the first end of the frame and the handlebar frame. The child carrier folds when the handlebar frame pivots on the frame towards the first end of the frame. Conversely, the child carrier becomes taut when the handlebar frame pivots on the frame towards the back end of the frame. The child carrier also includes an adjustable canopy extendable over the child carrier.

According to a seventh aspect of the present invention, the first end of the frame with the at least one front wheel is rotatably connected to a collar disposed at a first end of the outer member, wherein the first end of the frame is rotatable within the collar between one of a vertical orientation and a horizontal orientation relative to the frame.

Additional advantages and novel features of the invention will be partially set forth in the description that follows, and will also become apparent to those skilled in the art upon examination of the following or upon learning by practice of the invention.

BRIEF DESCRIPTION OF DRAWINGS

Other aspects of the present invention will be better understood from the following description, along with the accompanying drawings, wherein:

FIG. 6(a) illustrates the first and second telescoping members extending from the outer member, wherein the stopping mechanism includes longitudinal ridges and engaging pins extending therefrom;

FIG. 6(b) illustrates the first and second telescoping members fully retracted into the outer member;

FIG. 12 illustrates a perspective a back view of the handlebar frame;

FIG. 14 illustrates a perspective front view of the handlebar frame;

FIG. 16 is a perspective view of a left transverse member;

DETAILED DESCRIPTION OF THE INVENTION

In the different figures, the same reference numbers designate identical or similar features or components.

Figure 1:
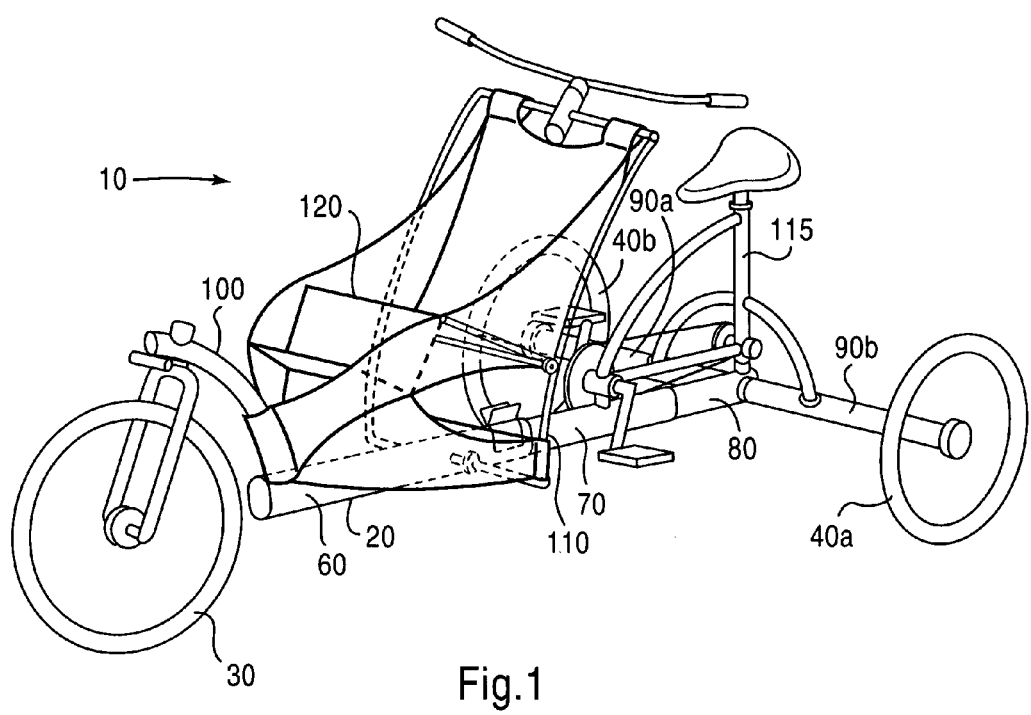
FIG. 1 is a perspective view of the vehicle of the present invention in a fully extended and rideable configuration according to a preferred embodiment of the present invention.

The present invention relates to a vehicle 10 for carrying a child that is propelled by an operator that is either walking, jogging, or running. The vehicle is steerable with handlebars and convertible from a push stroller to a rideable, operator-powered tricycle. As illustrated in FIG. 1, a preferred embodiment of the present invention includes a frame 20, a front wheel 30, and rear wheels 40. The frame 20 includes an outer member 60, a first telescoping member 70, and a second telescoping member 80. The second telescoping member 80 nests within the first telescoping member 70, which nests within the outer member 60.

While a preferred embodiment of the present invention is described herein as having two telescoping members, it is within the scope of the present invention for the frame to include any number of telescoping members. The first telescoping member 70 is slideable within the outer member 60, and the second telescoping member 80 is slideable within the first telescoping member 70. In the preferred embodiment, the frame members 60, 70, and 80 are manufactured from aluminum but can be manufactured from any appropriate and/or suitable material, such as steel or titanium, or a suitable composite material, such as a carbon fiber epoxy composite.

The frame 20 additionally includes tubular right and left transverse members 90a and 90b attached to a back end of the second telescoping member 80. Right and left rear wheels 40a and 40b attach to an outboard end of the right and left transverse members 90a and 90b and are rotatable thereon. In the preferred embodiment, the rear wheels 40a and 40b are easily detachable and reattachable to the outboard ends of the transverse members 90a and 90b, such as by using a quick release hub common in present bicycle applications.

A front support member 100 attaches to a front of the frame 20 for supporting the front wheel 30. Additionally, the vehicle 10 includes a rotatable handlebar assembly 110, an attachable seat frame assembly 115, and a foldable child-carrying feature 120.

Figure 2A:
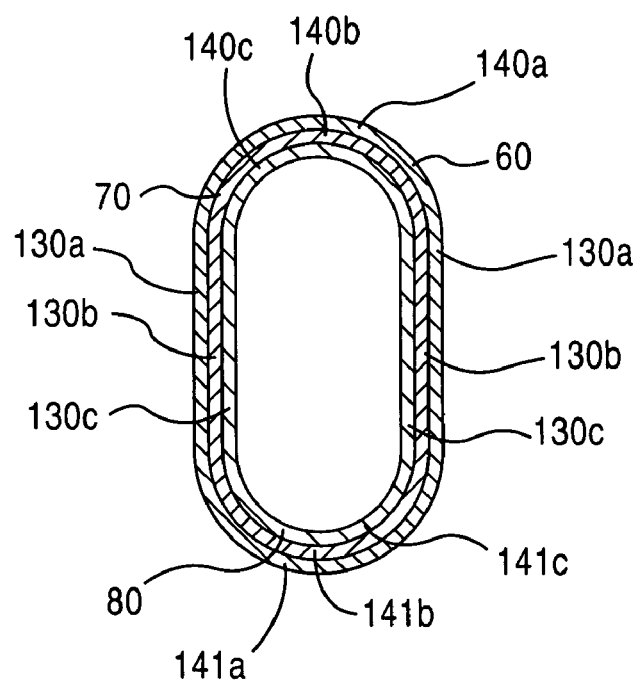
FIG. 2(a) is a cross-sectional view of the outer member and the telescoping members of the vehicle illustrated in FIG. 1.
Figure 2B:
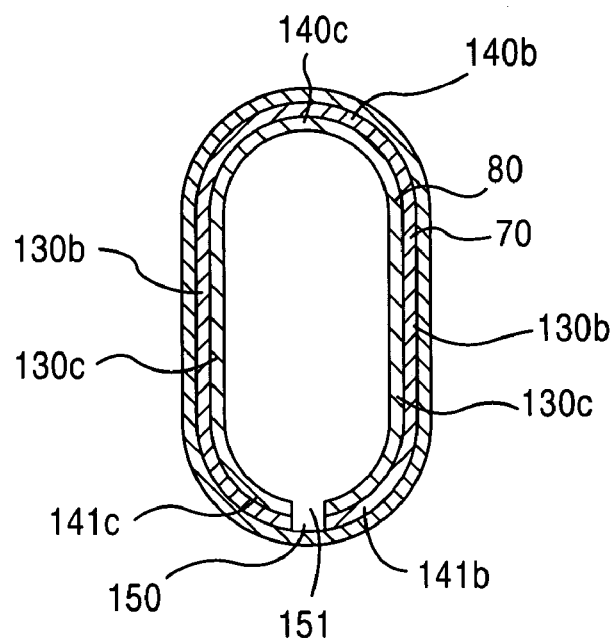
FIG. 2(b) is a cross-sectional view illustrating a slot formed in a lower rounded end wall of the telescoping members.

FIG. 2(a) is a schematic diagram depicting, in cross-section, an exemplary structure for each frame member 60, 70, and 80. Identical features of the different frame members 60, 70 and 80 will be designated with different letters. Accordingly, frame member 60, 70, and 80 includes a pair of relatively flat, elongated vertical sides 130a, 130b, and 130c, respectively, enclosed at an upper end by upper rounded end walls 140a, 140b, and 140c, respectively. The elongated vertical sides 130a, 130b, and 130c are enclosed at a lower end by lower rounded end walls 141a, 141b, and 141c. The vertical sides 130a, 130b, and 130c; upper end walls 140a, 140b, and 140c; and lower end walls 141a, 141b, and 141c prevent the telescoping members from rotating relative to each other. Referring to FIG. 2(b), the frame members 70 and 80 optionally include a longitudinal slot 150 and 151, respectively, in one of the upper and lower rounded end walls 140b and 140c or 141b and 141c, respectively.

Figure 2C:
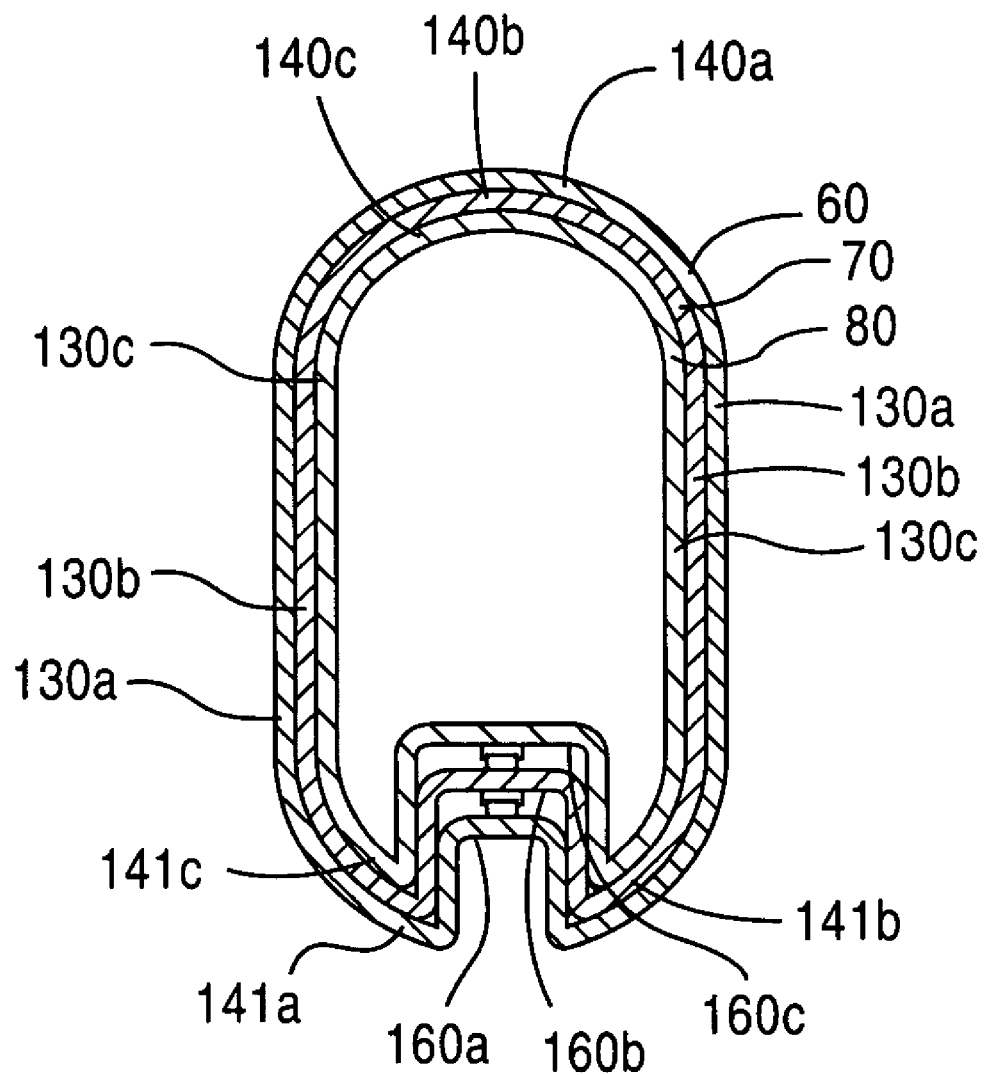
FIG. 2(c) is a cross-sectional view illustrating an alternate structural configuration of the outer member and the telescoping members.

Alternately, the outer member 60 and first and second telescoping members 70 and 80 each may include longitudinal ridges 160a, 160b, and 160c, respectively, extending inwards from the respective lower rounded end walls 141a, 141b, and 141c, as shown in FIG. 2(c). Although the longitudinal ridges 160a, 160b, and 160c are illustrated as being formed in the lower rounded end walls 141a, 141b, and 141c, it is within the scope of the present invention to include the longitudinal ridges 160a, 160b, and 160c in the upper rounded end walls 140a, 140b, and 140c of the outer member 60 and first and second telescoping members 70 and 80.

As shown, the longitudinal ridges 160a, 160b, and 160c of the first and second telescoping members 70 and 80 and the outer member 60 nest within each other. Further, the longitudinal ridges 160a, 160b, and 160c add rigidity and slidingly interlock the outer member 60, and the first and second telescoping members 70 and 80 together. The function of the longitudinal slots 150 and 151 and the longitudinal ridges 160a, 160b, and 160c is described in further detail below.

Telescoping Feature

Figure 3:
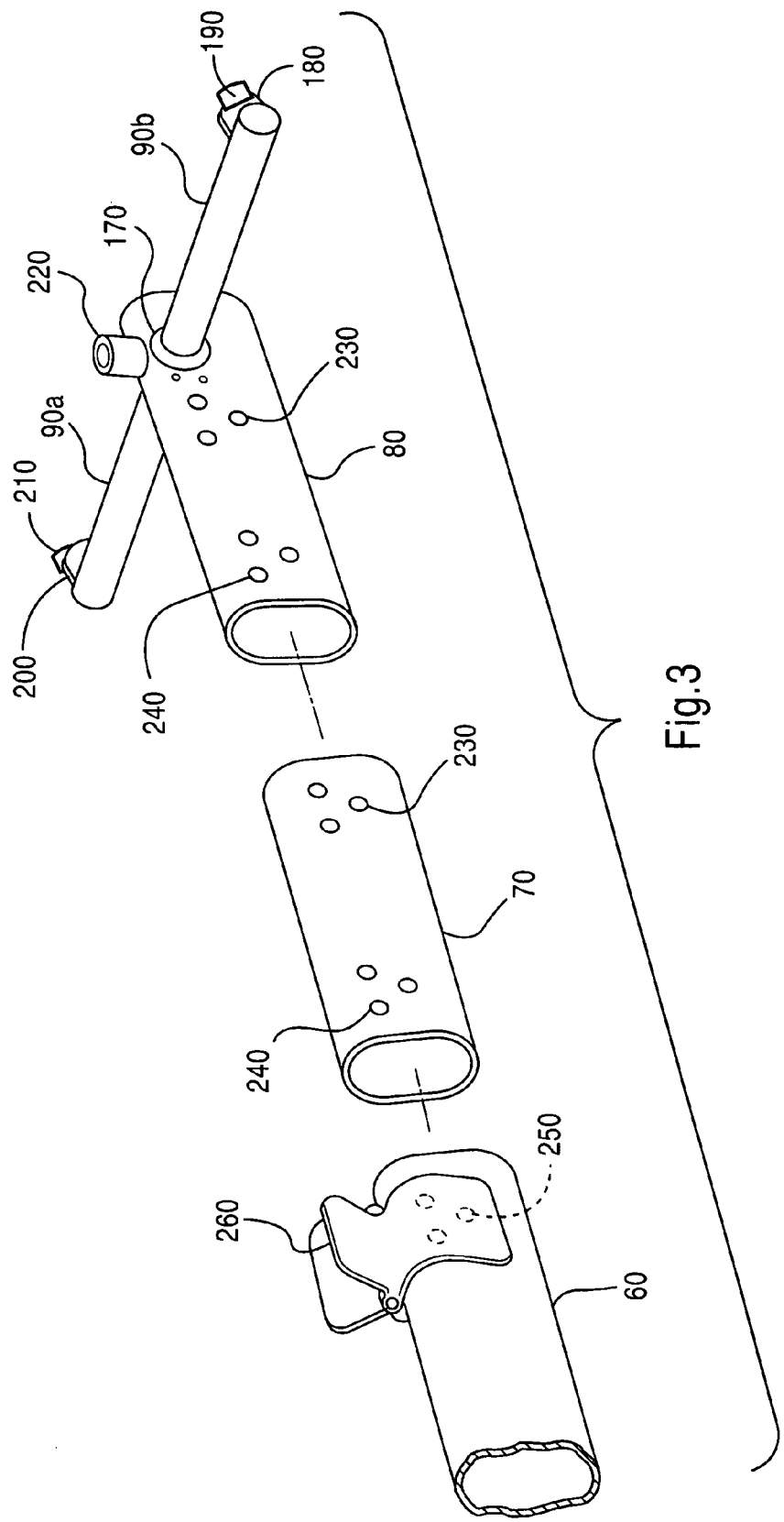
FIG. 3 is an exploded view of the outer member and the first and second telescoping members.
Figure 4:
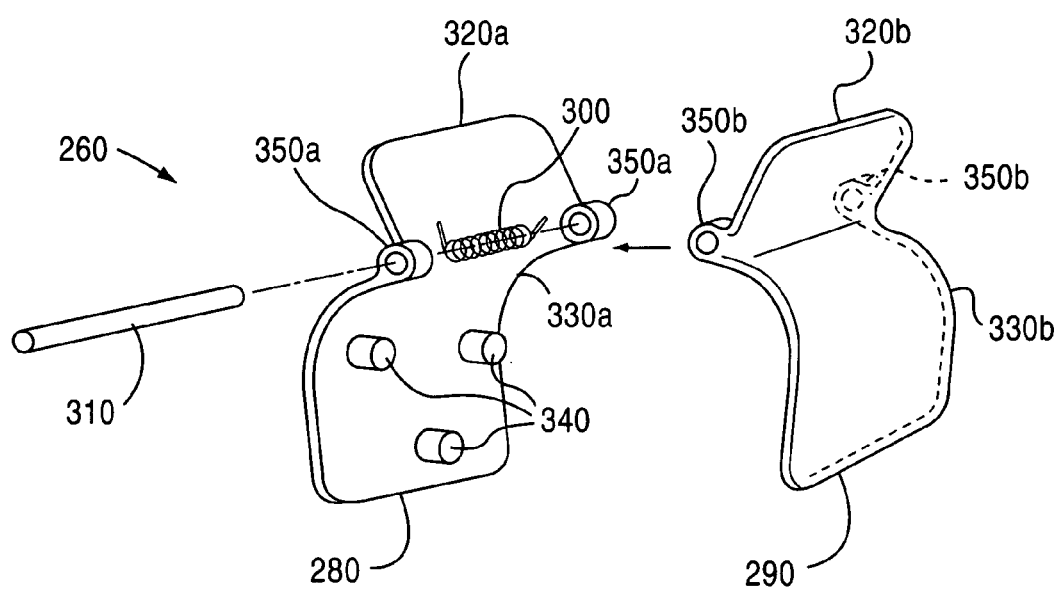
FIG. 4 is an exploded view of a clamp attached to the outer member.

A back end of the vehicle 10 will be described in more detail with reference to FIGS. 3-5. Referring to FIG. 3, the second telescoping member 80 includes outwardly extending rims 170a and 170b (not shown) provided on corresponding elongated vertical sides 130a that define openings (not shown) therein. The transverse members 90a and 90b attach to the corresponding rims 170a and 170b, wherein the rims 170a and 170b and the transverse members 90a and 90b provide communication between an inside and an outside of the second telescoping member 80. A flange 180 is attached to an outer surface of the left transverse member 90b at an outboard end. A first rear brake assembly 190 attaches to the flange 180. Optionally, another flange 200 may be attached to an outer surface of the right transverse member 90a at an outboard end. A second rear brake assembly 210 will then be attached to the second flange 200. The second telescoping member 80 further includes an upwardly extending boss 220 on the upper rounded end wall 140a. A passageway is formed through the upwardly extending boss 220 and also provides communication between the inside and outside of the second telescoping member 80. Moreover, the upwardly extending boss 220 longitudinally aligns with the rims 170.

Openings 230 are defined in the vertical sides 130b and 130c proximate back or rear ends of the first and second telescoping members 70 and 80. Additional openings 240 are defined on the vertical sides 130b and 130c proximate front or forward ends of the telescoping members 70 and 80. The outer member 60 similarly includes openings 250 in the vertical sides 130a at a back or rear end thereof. While FIG. 3 illustrates the openings 230, 240, and 250 as having three (3) pairs of openings, respectively, it is within the scope of the invention that the openings 230, 240, and 250 include any number of openings.

Figure 5A:
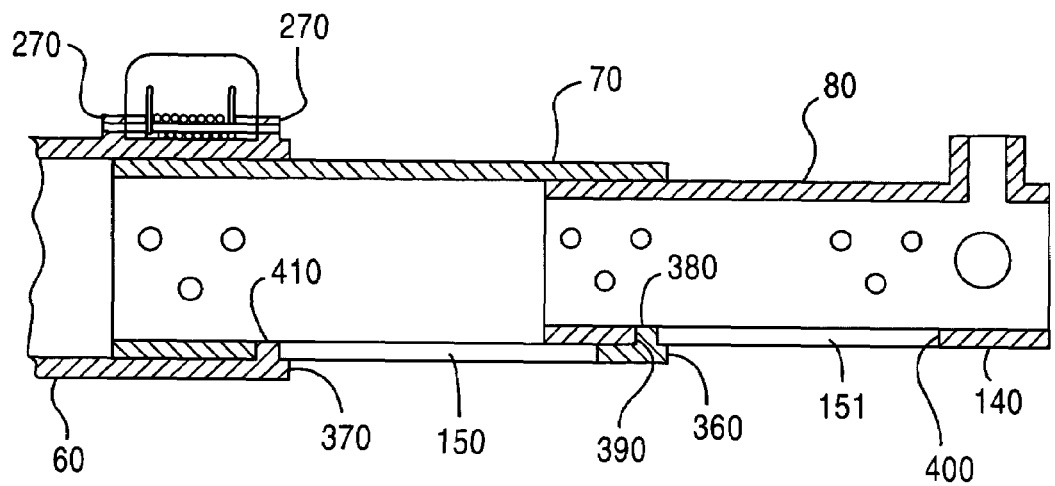
FIG. 5(a) illustrates the first and second telescoping members extending from the outer member, wherein the stopping mechanism includes a slot and pin assembly.

A spring-loaded clamp 260 attaches to mounting bosses 270 on the upper rounded end wall 140 of the outer member 60 as shown in FIG. 5(a). One embodiment of the clamp 260, illustrated in FIG. 4, includes a first half 280, a second half 290, a spring 300, and a pivoting pin 310. The first and second halves 280, 290 respectively include an upper grasping member 320a and 320b, lower clamping member 330a and 330b, pins 340a and 340b provided on an inner surface of the corresponding lower clamping member 330a and 330b, and retaining members 350a and 350b. The spring 300 biases the lower clamping members 330a and 330b towards each other. The clamp 260 attaches to the mounting bosses 270 (FIG. 5(a)) of the outer member 60 with the pivoting pin 310 that is inserted through the mounting bosses 270, the retaining members 350a and 350b, and the spring 300. In an assembled condition, the pins 340a and 340b align with the openings 250 of the outer member 60.

When the telescoping frame members 70 and 80 are fully retracted into the outer member 60, the openings 230 in each of the first and second telescoping members 70 and 80 align with the openings 250 of the outer member 60. The pins 340 are inserted into and engage the openings 230 and 250, securing the first and second telescoping members 70 and 80 in place relative to the outer member 60.

Figure 5B:
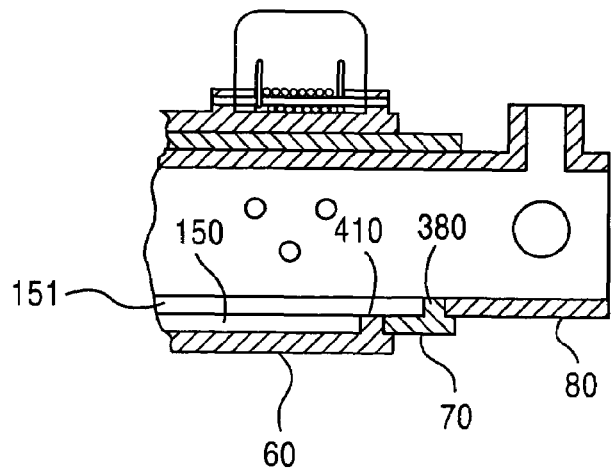
FIG. 5(b) illustrates the first and second telescoping members in a fully retracted state.

FIGS. 5(a) and 5(b) illustrate the telescoping members 70 and 80 in fully extended and fully retracted states, respectively, wherein the telescoping members 70 and 80 include the longitudinal slot 150. Also illustrated are first and second stopping mechanisms 360 and 370. In one embodiment, the first stopping mechanism 360 includes a pin 380 attached to a back portion of the first telescoping member 70. The pin 380 is slideable within the longitudinal slot 151 formed in the lower end wall 140c of the second telescoping member 80. While being telescopically extended, the second telescoping member 80 slides within the first telescoping member 70 until the pin 380 contacts a front surface 390 that helps define the slot 151 of the second telescoping member 80. While being telescopically retracted, the second telescoping member 80 is slideable within the first telescoping member 70 until the pin 380 contacts a back surface 400 that helps to define the slot 150 of the second telescoping member 80. Similar to the first stopping mechanism 360, the second stopping mechanism 370 includes a pin 410 attached to a back portion of the outer member 60. The pin 410 is slideable within the longitudinal slot 150 formed in the lower end wall 140 of the first telescoping member 70. The pin 410 operates in an identical fashion as the pin 380. Therefore, an explanation of the pin 410 is omitted to avoid redundancy. Further, it is within the scope of the present invention that the slots 150 be formed in the upper rounded end wall 140 of the first and second telescoping members 70 and 80.

FIGS. 6(a) and 6(b) illustrate an embodiment of the present invention wherein the outer member 60' and first and second telescoping members 70' and 80' include the longitudinal ridge 160 (FIG. 2(b)). The first and second telescoping members 70', 80' extend and retract identically as described above, except that the first and second stopping mechanisms 360' and 370' include engaging pins. In particular, the first stopping mechanism 360' includes front and rear pins 420a and 420b extending downward from a lower surface of the longitudinal ridge 160 of the second telescoping member 80' proximate opposing ends thereof and a pin 430 extending upward from an upper surface of the longitudinal ridge 160 of the first telescoping member 70' proximate a back end thereof. When the second telescoping member 70' is fully extended, the downward extending pin 420a proximate a front end of the second telescoping member 80' engages the upward extending pin 430 of the first telescoping member 70'. When the second telescoping member 80' is fully retracted, the downward extending pin 420b proximate a back of the second telescoping member 80' engages the upward extending pin 430 of the first telescoping member 70'.

A gap 435 is defined between a lower end of the pins 420a and 420b and the upper surface of the longitudinal ridge 160 of the first telescoping member 70'. Another gap 436 is also defined between an upper end of the pin 430 and the lower surface of the longitudinal ridge 160 of the second telescoping member 80', wherein the first and second telescoping members 70', 80' freely slide relative to each other until the pins 420a, 420b, and 430 engage each other.

The second stopping mechanism 370' includes front and rear pins 440a and 440b extending downwards from a lower surface of the ridge 160 of the first telescoping member 70' proximate opposing ends thereof and a pin 450 extending upwards from an upper surface of the ridge 160 of the outer member 60' proximate a back end thereof. The pins 440a, 440b, and 450 of the second stopping mechanism 370' are configured and operate similar to the pins 420a, 420b, and 430 of the first stopping mechanism 360'. Therefore, discussion of these features is omitted herefrom to avoid redundancy.

Although the following discussion is made with reference to the embodiment of the present invention having the first and second stopping mechanism 360 and 370, the discussion is also applicable to the embodiment of the present invention having the first and second stopping mechanisms 360' and 370'.

To extend the first and second telescoping members 70 and 80, the grasping members 320a and 320b of the clamp 260 (FIG. 4) are urged towards one another, causing the clamping members 330a and 330b to move away from each other and retracting the pins 340a and 340b from the openings 230 and 250. Then, the second telescoping member 80 is extended longitudinally out of the first telescoping member 70, until the second telescoping member 80 engages the first stopping mechanism 360.

Once the second telescoping member 80 engages the first stopping mechanism 360, the openings 240 in the second telescoping member 80 align with the openings 230 in the first telescoping member 70. The first stopping mechanism 360 then urges the first telescoping member 70 to extend from the outer member 60 until the second stopping mechanism 370 engages the first telescoping member 70.

Once the first telescoping member 70 engages the second stopping mechanism 370, the openings 240 of the first telescoping member 70 align with the openings 250 of the outer member 60, and the first and second telescoping members 70 and 80 are fully extended. The grasping members 320a and 320b are then released, causing the pins 340a and 340b to engage into the openings 250 of the outer member 60 and openings 240 in the first telescoping member 70 due to the bias provided by the spring 300. As such, the pins 340a and 340b secure the first telescoping member 70 in place relative to the outer member 60. To retract the first and second telescoping members 70 and 80, the above-detailed process is reversed. The grasping members 320a and 320b are urged towards one another, retracting or disengaging the pins 340a and 340b from the openings 250 of the outer member 60 and openings 240 of the first telescoping member 70. Next, the second telescoping member 80 slides or telescopes into the first telescoping member 70 until the first stopping mechanism 360 engages the first telescoping member 70, wherein the openings 230 of the first and second telescoping members 70 and 80 are aligned with each other. Thereafter, both the first and second telescoping members 70 and 80 retract into the outer member 60 until the second stopping mechanism 370 engages the outer member 60, wherein the openings 230 of the first and second telescoping members 70 and 80 align with the openings 250 of the outer member 60. Then, the grasping members 320a and 320b are released, causing the pins 340a and 340b to be inserted into the openings 250 of the outer member 60 and the openings 230 of the first and second telescoping members 70 and 80, respectively, thereby securing the first and second telescoping members 70 and 80 to the outer member 60.

Figure 7:
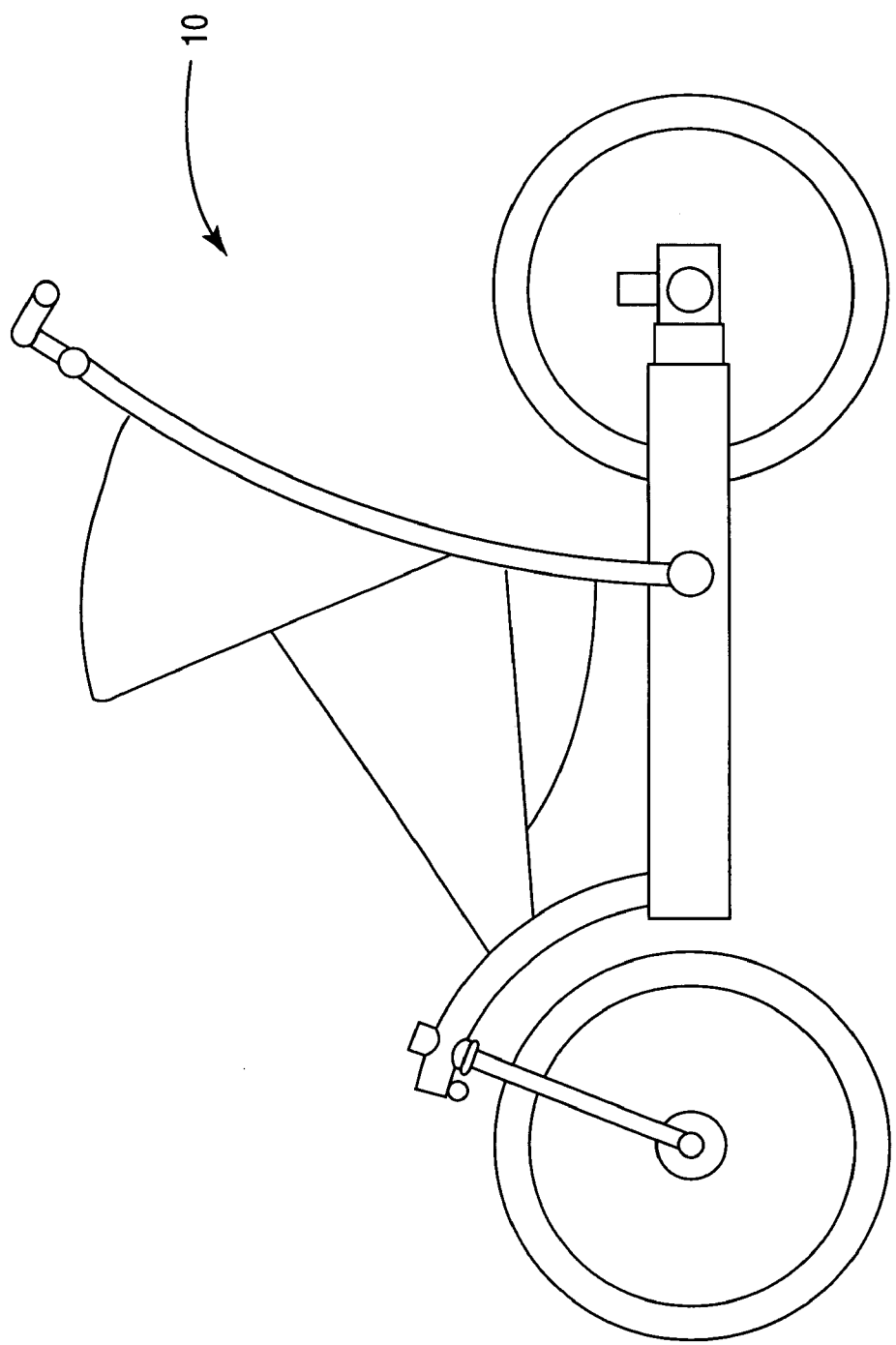
FIG. 7 illustrates the vehicle in a pushable configuration.

Therefore, when the first and second telescoping members 70 and 80 are in a fully retracted state, the vehicle 10 is in a stroller configuration, as shown in FIG. 7. Conversely, when the first and second telescoping members 70 and 80 are in a fully extended state, the vehicle 10 is in a riding configuration, as shown in FIG. 1.

Steering Feature

Figure 8:
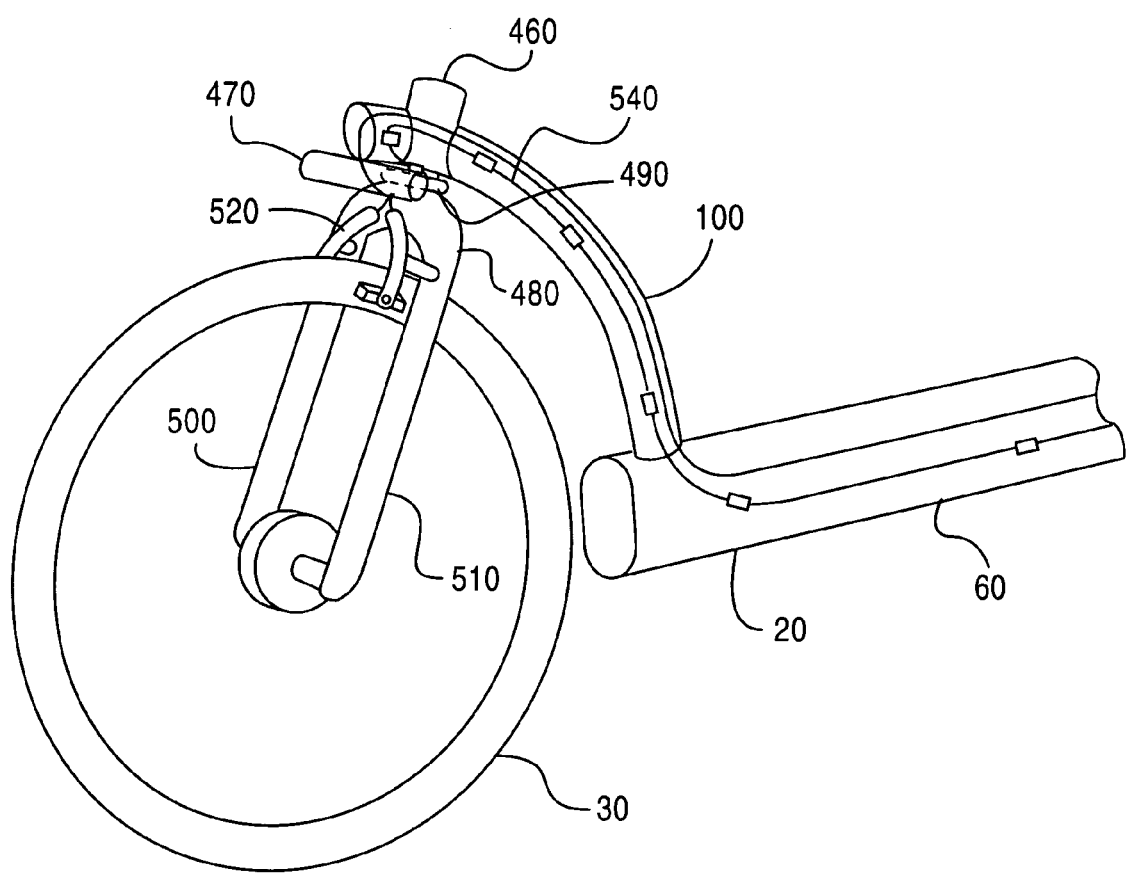
FIG. 8 illustrates a partial side view of a forward end of the vehicle.

Referring to FIG. 8, the support member 100 extends upwardly from a front or forward end of the frame 20. The support member 100 includes a post 460 and a cross beam 470. A front fork 480 is rotatably retained within the post 460. A flange 490 is disposed at a lower end of the post 460. The flange 490 and the front fork 480 are securedly attached and rotate in unison. The front fork 480 includes right and left members 500 and 510. The front wheel 30 is rotatably disposed between the right and left members 500 and 510. Additionally, a front brake assembly 520 attaches to a front portion of the front fork 480 in order to operationally engage the wheel 30 as needed by an operator. In one embodiment, the front brake assembly 520 is a conventional rim-type brake assembly well known in the bicycle industry. Alternately, the front brake assembly 520, shown in FIG. 8, is a disk-type brake also well-known in the bicycle industry.

Again referring to FIG. 8, one end of a front brake cable 530 connects to the front brake assembly 520. Also, a left steering cable 540 and right steering cable (not shown) attach at respective ends to the flange 490, which is illustrated in more detail in FIGS. 9(a) and (b).

Figure 9B:
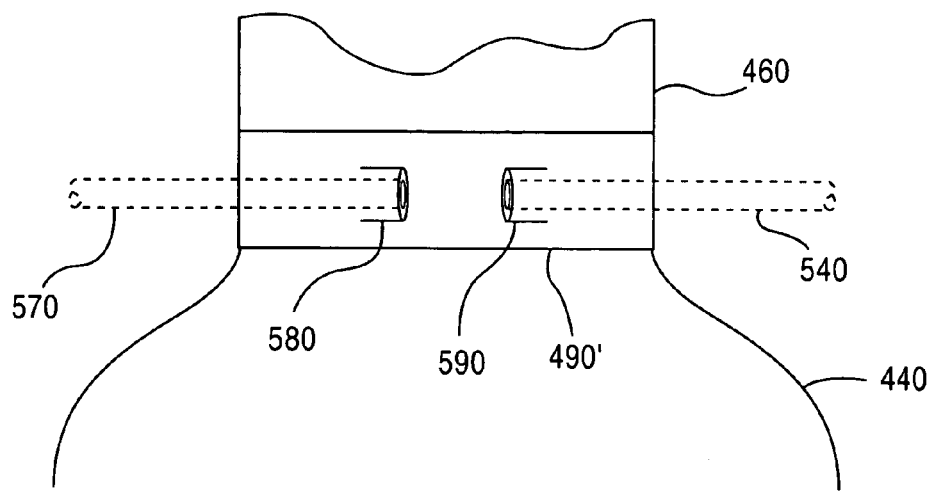
FIG. 9(b) illustrates a second embodiment of the flange attached to the front fork.
Figure 9A:
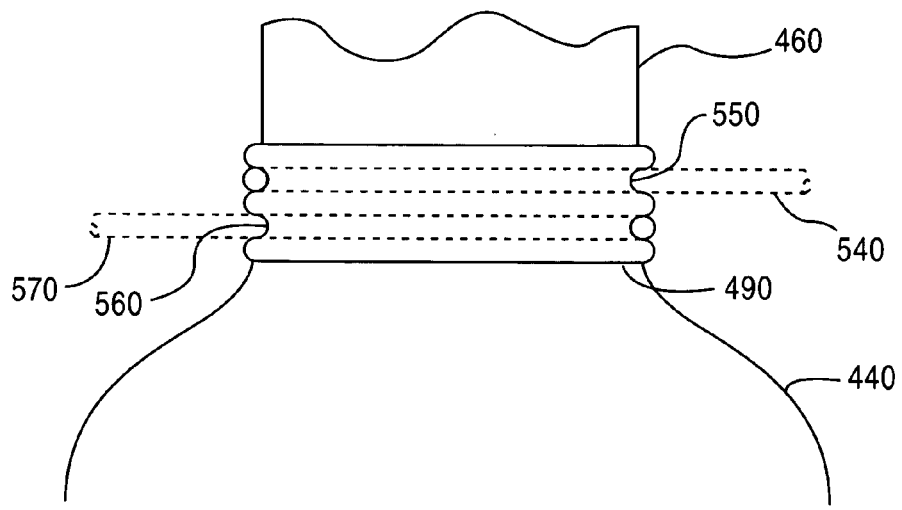
FIG. 9(a) illustrates a flange attached to the front fork.

FIG. 9(a) illustrates a front view of one embodiment of the flange 490 having an upper groove 550 and lower groove 560. An outer end portion of the left steering cable 540 occupies the upper groove 550 and attaches at a back portion thereof, while an outer end portion of the right steering cable 570 occupies the lower groove 560 and also attaches to a back portion thereof. However, it is also within the scope of the present invention that the left steering cable 540 occupy the lower groove 560 and the right steering cable 570 occupy the upper groove 550. This arrangement enables the left or right steering cables 540 and 570 to impart a moment to rotate the flange 490 and, accordingly, the front fork 440.

An alternate embodiment of the flange 490' is illustrated in FIG. 9(b), wherein the flange 490' includes right and left slots 580 and 590 at a front thereof. The outer end of each of the left and right steering cables 540 and 570 attach at the left and right slots 580 and 590, respectively. Similarly, the flange 490' of this embodiment enables the left or right steering cables 540 and 570 to impart a moment to rotate the flange 490' and the front fork 480.

Figure 10:
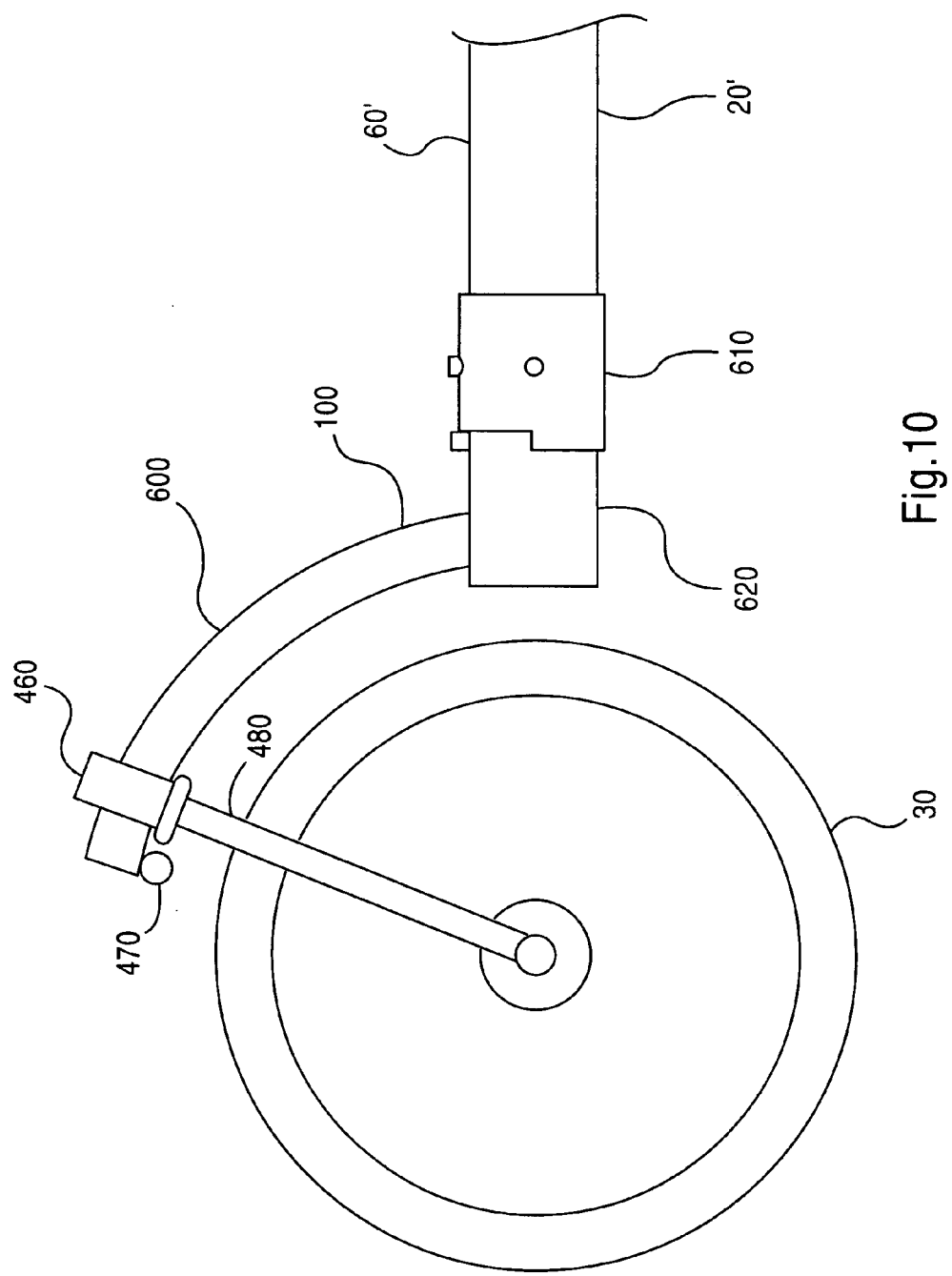
FIG. 10 illustrates a pivoting member rotatable within the cylindrical collar.
Figure 11A:
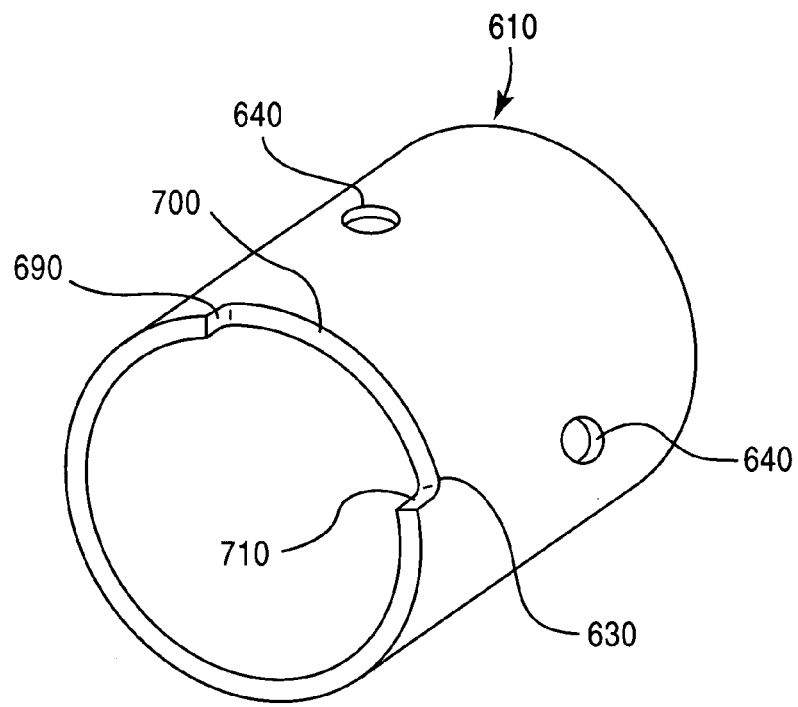
FIG. 11(a) illustrates a perspective view of the cylindrical collar.
Figure 11B:
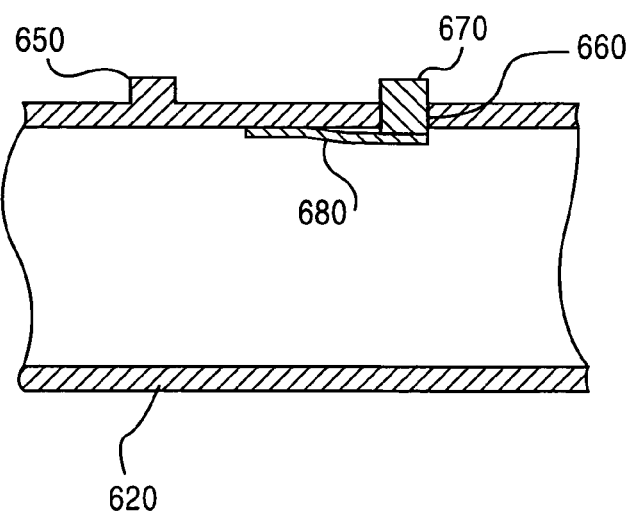
FIG. 11(b) illustrates a cross-sectional view of the pivoting member.

An alternate embodiment of the front of the frame 20' is illustrated in FIG. 10. The front of the frame 20' includes a front fork assembly 600 and a cylindrical collar 610. The front fork assembly 600 includes a pivoting member 620, the support member 100' attached at a lower end thereto, the post 460, the cross beam 470, the front fork 480 retained within the post 460, and the front wheel 30. The front fork assembly 600 is rotatable within the cylindrical collar 610. Referring to FIGS. 10-11(*b*), the cylindrical collar 610 attaches to the front end of the outer member 60' and includes a slot 630 in a front edge. The slot 630 extends 900 around a circumference of the cylindrical collar 610, beginning, for example, at a twelve o'clock position and terminating, for example, at a three o'clock position. Additionally, the cylindrical collar 610 includes openings 640, which extend through an entire wall thickness of the cylindrical collar 610, with one opening 640*a* located, for example, at the twelve o'clock position, and a second opening 640*b* located, for example, at the three o'clock position.

Referring to FIG. 11(*b*), the pivoting member 620 also includes a fixed pin 650, an opening 660, and a spring-loaded locking pin 670 extending through the opening 660. The fixed pin 650 is affixed to an outer surface of the pivoting member 620. The locking pin 670 is mounted to a spring member 680 at a lower end and freely extends at an opposite end through the opening 660. An end of the spring member 680 opposite the locking pin 670 attaches to an inner surface of the pivoting member 620. The spring member 680 biases the locking pin 670 upwards through the opening 660 in the pivoting member 620 and one of the openings 640*a* and 640*b* in the cylindrical collar 610.

The locking pin 670 extends through the opening 660 in the pivoting member 620 and the opening 640*a* in the cylindrical collar 610 located at the twelve o'clock position when the front fork assembly 600 is in a vertical orientation. Also, the fixed pin 650 extends into the slot 630 at the twelve o'clock position and abuts both a first end surface 690 and a side surface 700 thereon.

When storing or transporting the vehicle 10, in addition to fully retracting the first and second telescoping members 70 and 70' and 80 and 80', the locking pin 670 is depressed, allowing the pivoting member 620 to rotate within the cylindrical collar 610. Once the pivoting member 620 rotates 900, the fixed pin 650 contacts a second end surface 710 of the slot 630 and the locking pin 670 is forced through the opening 640*b*, located at the three o'clock position, by the spring member 680. Thereafter, the front fork assembly 600 resides in a horizontal plane, converting the vehicle 10 into a more compact configuration.

Rotatable Handlebars Feature

Referring to FIG. 12, the handlebar assembly 110 includes a handlebar frame 720 and a handlebar 730. The handlebar assembly 110 rotatably attaches to the frames 20 and 20' at outwardly extending flanges 740 mounted on extensions 750. The handlebar frame 720 includes right and left side members 760 and 770 attached at upper ends to right and left upper members 780 and 790, respectively, and at lower ends to right and left lower members 800 and 810, respectively. A mating flange 820 is attached to an inboard end of each of the right and left lower members 800 and 810.

The handlebar frame 720 further includes positioning mechanisms 830 affixed to a lower portion of the right and left side members 760 and 770, as well as a post 840 mounted between opposing inboard ends of the right and left upper members 780 and 790. The handlebar 730 includes an inner post 850 rotatable within the post 840 of the handlebar frame 720, grips 860, a gear selector 870, and front and rear brake levers 880 and 890. Additionally, the front and rear brake levers 880 and 890 and the gear selector 870 include, but are not limited to, components presently used in conventional bicycles for braking and changing gears.

A flange 900 attaches to a bottom of the inner post 850 at a lower end of the post 840. Two embodiments of the flanges 900 and 900' are illustrated in more detail in FIGS. 13(*a*) and (*b*), which are essentially identical to the previously described embodiments of the flange 490 attached to the front fork 480.

Figure 13B:
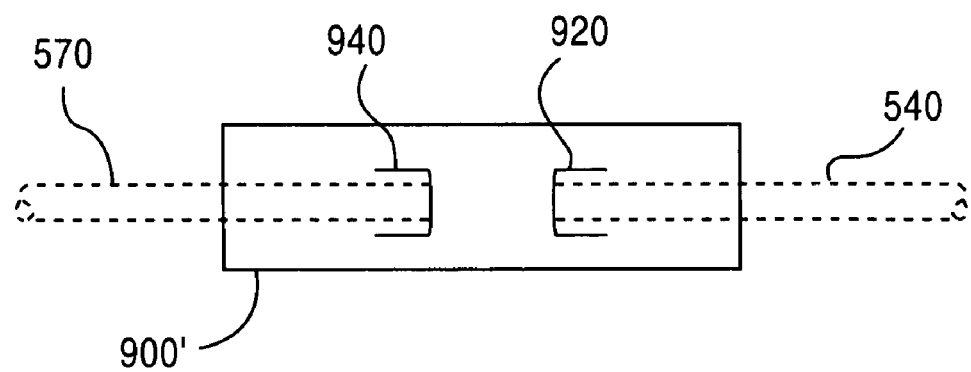
FIG. 13(b) illustrates a second embodiment of the flange attached to the handlebar.
Figure 13A:
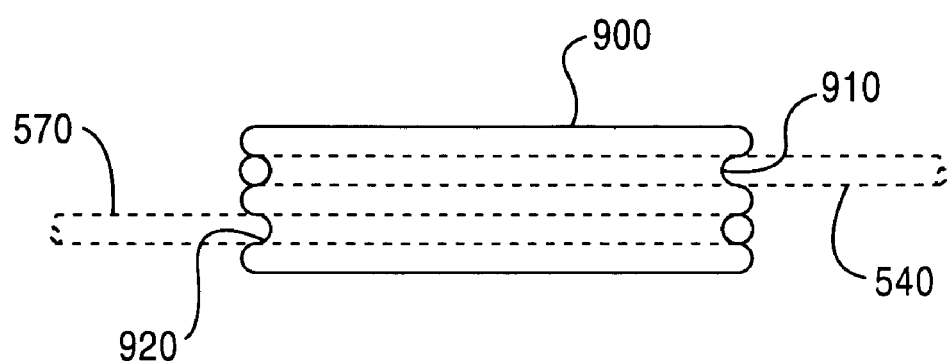
FIG. 13(a) illustrates a first embodiment of the flange attached to the handlebar.

FIG. 13(*a*) illustrates a front view of one embodiment of the flange 900 having an upper groove 910 and lower groove 920. An outer end portion of the left steering cable 540 occupies the upper groove 910 and attaches to a back portion thereof, while an outer end portion of the right steering cable 570 occupies the lower groove 920 and also attaches to a back portion thereof. It is also within the scope of the present invention to have the left steering cable 540 occupy the lower groove 920 and the right steering cable 570 occupy the upper groove 910. This arrangement enables the handlebar 730 to displace the left or right steering cables 540 and 570 by rotating the handlebar 730 in a respective left or right direction.

An alternate embodiment of the flange 900' is illustrated in FIG. 13(*b*), wherein the flange 900' includes left and right slots 930 and 940 at a front thereof. The outer ends of each of the left and right steering cables 540 and 570 attach at the left and right slots 930 and 940, respectively. Similarly, the flange 900' of the present embodiment enables the handlebar 730 to displace the left or right steering cables 540 and 570 when turning the handlebar 730 in the respective left or right direction.

Optionally, the handlebar frame 720 includes a fixing mechanism 945 that releasably locks the handlebar 730 into a fixed position and prevents the handlebar 730 from rotating within the post 840.

Control Cables

Figure 15:
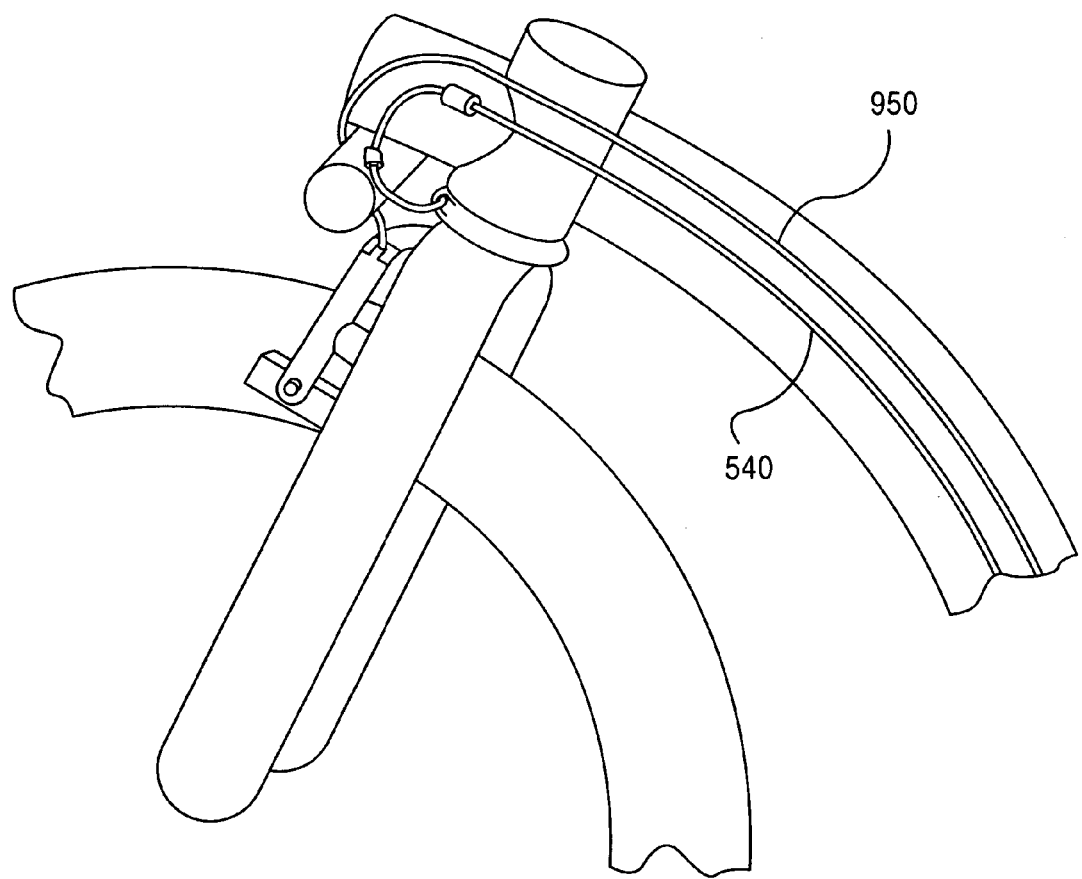
FIG. 15 is a perspective view of the support member and front fork with a left steering cable and front brake cable disposed thereon.

Control cables will now be discussed with reference to FIGS. 12 and 14-16. While FIGS. 12 and 14-16 illustrate a particular layout of various control cables, it is within the scope of the invention that the various control cables be routed in any number of suitable configurations. Referring to FIGS. 12 and 15, the left steering cable 540 extends from the flange 900 along a back surface of the left upper member 790, downward along a back surface of the left side member 770, inward along the left lower member 810 toward the outer member 60, forward along the left elongated vertical wall 130 of the outer member 60, upward along the support member 100, outward along a left end of the cross beam 470, and inwards toward the flange 490. Referring to FIGS. 12 and 14, the right steering cable 570 extends from the flange 900 along a back surface of the right upper member 780, downward along a back surface of the right side member 760, inward along the right lower member 800 toward the outer member 60, forward along the right elongated vertical wall 130 of the outer member 60, upward along the support member 100, outward along a right end of the cross beam 430, and back toward the flange 490. Therefore, when the handlebar 730 is rotated in the left direction, the left steering cable 540 is pulled and the right steering cable 570 is slackened. As a result, the end of the left steering cable 540, connected to the flange 490, displaces, causing the flange 490, the front fork 480, and, accordingly, front wheel 30 to rotate in the left direction. Conversely, when the handlebar 730 is rotated in the right direction, the right steering cable 570 is pulled, and the left steering cable 540 is slackened. Hence, the end of the right steering cable 570, connected to the flange 490, displaces, causing the flange 490, the front fork 480, and the front wheel 30 to rotate in the right direction.

A front brake cable 950 extends from the front brake lever 880 inward along the handlebar 730, downward along the post 840, outward along a front surface of the left upper member 790, downward along a front surface of the left side member 770, inward along the left lower member 810 and left extension 750, forward along the left elongated vertical wall 130 of the outer member 60, upward along a left side of the support member 100, and downwards toward the front brake assembly 520. A rear brake cable 960 and gear selector cable 970 extend from the rear brake lever 890 and gear selector 870, respectively, along the handlebar 730, downward along the post 840, outward along a front surface of the right upper member 780, downward along a front surface of the right side member 760, inward along the right lower member 800, forward along the right elongated vertical wall 130 of the outer member 60, through respective openings 980 in the elongated vertical wall 130, and toward the back end of the frame 20 through the outer member 60, the first telescoping member 70, and the second telescoping member 80. The rear brake cable 960 and the gear selector cable 970 are coiled within the outer member 60 and the first and second telescoping members 70 and 80, for example, wherein the rear brake cable 960 and the gear selector cable 970 include a sufficient length of cable to permit the telescoping members to extend or retract and be operable in either configuration.

The rear brake cable 960 and gear selector cable 970 emerge from the second telescoping member 80 through openings 990 formed therein and, in one embodiment, extend along a front surface of the left transverse member 90, as shown in FIG. 16. The rear brake cable 960 attaches to the first rear brake assembly 190, and the gear selector cable 970 attaches to a hub of the left rear wheel 40 having internal gearing.

While the rear brake cable 960 is shown as extending to the first rear brake assembly 190, it is within the scope of the invention that the rear brake cable 960 branch into left and right end portions that extend to the first and second rear brake assemblies 190 and 210, respectively. Additionally, it is within the scope of the invention that the first and second rear brake assemblies 190 and 210 be hydraulic brakes rather than cable brakes.

Figure 17:
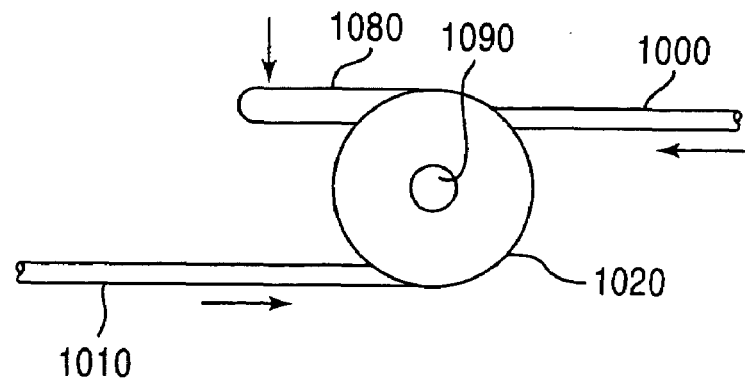
FIG. 17 shows the release lever of the handlebar assembly.

A release function of the handlebar assembly 110 will now be explained with reference to FIGS. 12 and 17-18. The handlebar assembly 110 further includes right and left release cables 1000 and 1010 attached at respective upper ends to a release lever 1020, as shown in FIG. 17. The right and left release cables 1000 and 1010 extend outward along the respective right and left upper members 780 and 790, downward along the right and left side members 760 and 770, and inward along the right and left lower members 800 and 810.

Figure 18:
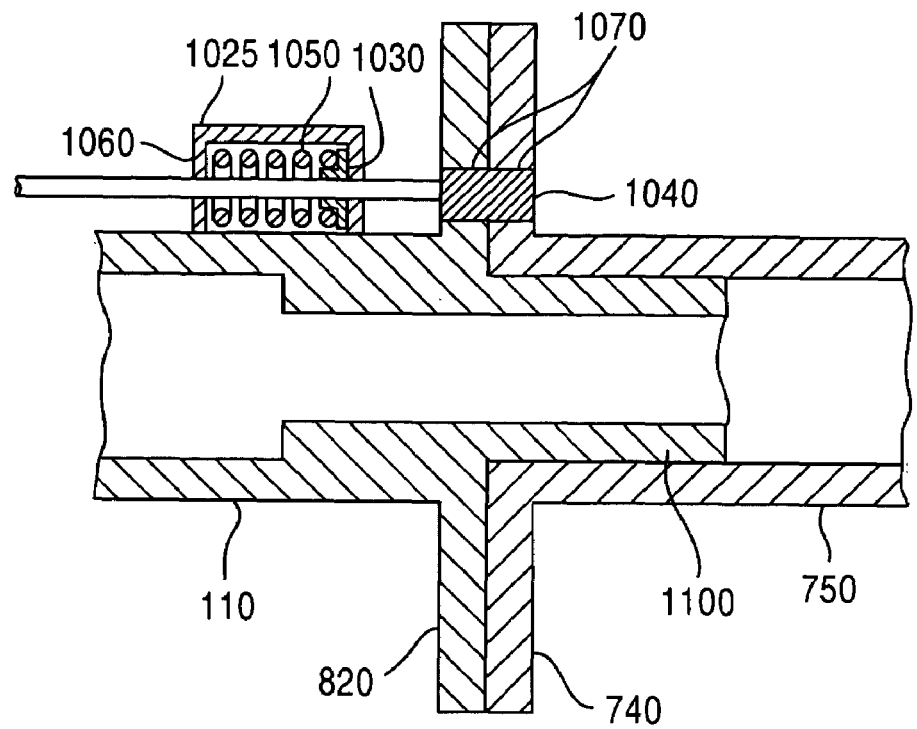
FIG. 18 is a partial cross-sectioned view of the handlebar assembly.

Referring to FIG. 18, a lower end of the left and right release cables 1000 and 1010 extends through a retainer 1025 and includes a flange 1030 secured to an outer surface thereof and a pin 1040. (FIG. 18 illustrates a lower end of the left release cable 1010 but is representative of the release function of both the left and right side release cables 1000 and 1010.) The retainer 1025 houses a spring 1050 compressed between an outer end wall 1060 and the flange 1030. In a locked configuration, the pin 1040 is retained within openings 1070 formed in both the flange 740 and mating flange 820.

When a moment arm 1080 of the release lever 1020 is depressed, the release lever 1020 rotates about a central pivot 1090, which pulls the upper ends of the right and left release cables 1000 and 1010 inwards and further compresses the spring 1050. As a result, the pins 1040 retract from the opening 1070 in the flange 740. Thereafter, the handlebar assembly 110 is freely rotatable on tabs 1100 inwardly extending from the mating flanges 820 and journaled within an inner surface of the extensions 750. When the handlebar assembly 110 is returned to an upright position, wherein the openings 1070 in both the flanges 740 and mating flanges 820 align, the pins 1040 are forced through the openings 1070 in the flanges 740 by the compressed spring 1050.

Cables used for steering, braking, and gear selecting include, but are not limited to, cables used in present bicycle applications to actuate wheel brakes or a chain derailleur.

Detachable Seat Frame Assembly and Drivetrain Feature

Figure 19:
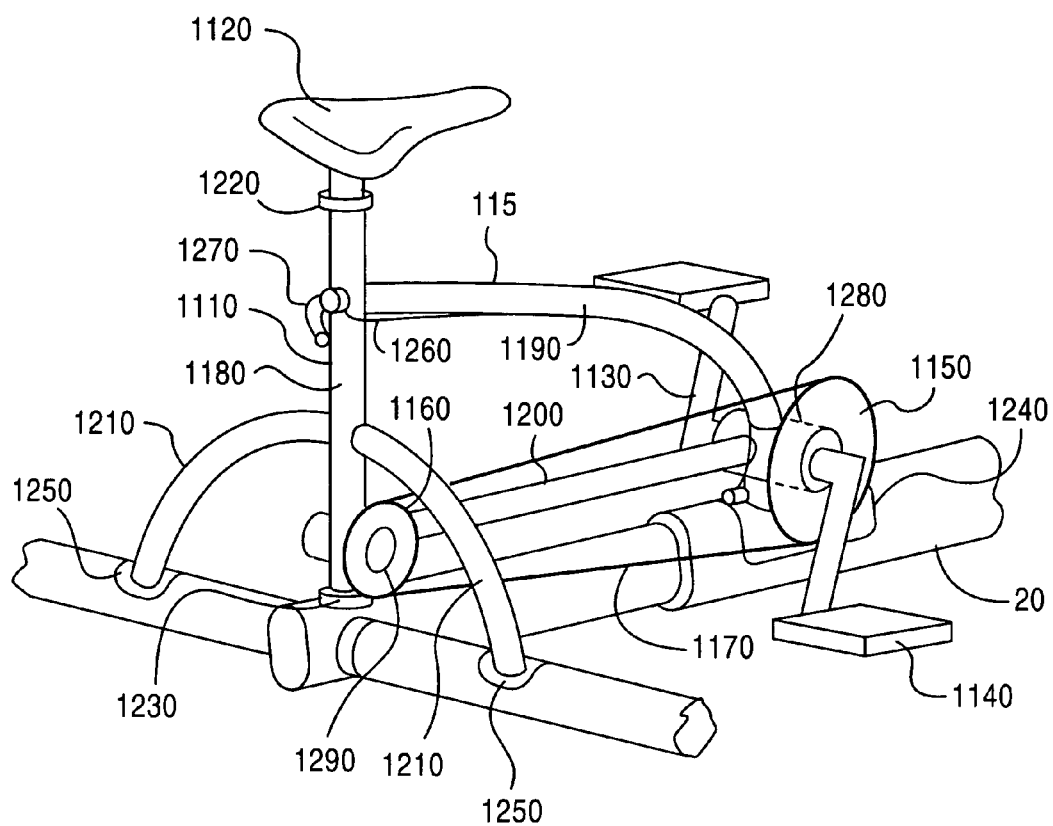
FIG. 19 is a perspective view of the seat frame assembly.

When the first and second telescoping members 70 and 70' and 80 and 80' are fully extended as described above, the seat frame assembly 115 is attachable to the frame 20. Referring to FIG. 19, the seat frame assembly 115 includes a frame 1110, a seat 1120, a crank 1130, pedals 1140 attached to opposing ends of the crank 1130, a front drive element 1150, a rear drive element 1160, and a continuous drive element 1170 extending between the front and rear drive elements 1150 and 1160.

The seat frame assembly 115 includes a post member 1180, a front member 1190 extending downwardly from an upper portion of the post member 1180, a lower brace member 1200 extending between lower portions of the post member 1180 and the front member 1190, and right and left cross members 1210 extending sideways from a lower portion of the post member 1180. An upper clamp 1220 is provided at an upper end of the post member 1180, and a lower clamp 1230 provided at a lower end of the post member 1180. Further, a spring-loaded clamp 1240 is attached to a lower end of the front member 1190, and a U-shaped member 1250 is attached at a lower end of each of the right and left cross members 1210. The front member 1190 and the cross members 1210 are illustrated as being arcuate, although it is within the scope of the invention that the front member 1190 and cross members 1210 be any shape, such as straight.

The seat frame assembly 115 further includes a release cable 1260, a release lever 1270, and front and rear tube portions 1280 and 1290. The front tube portion 1280 is hollow and extends sideways through the front member 1190 where the front member 1190 intersects the lower brace member 1200. The rear tube portion 1290 is also hollow and extends sideways through the post member 1180 where the post member 1180 and the lower brace member 1130 intersect.

Figure 20:
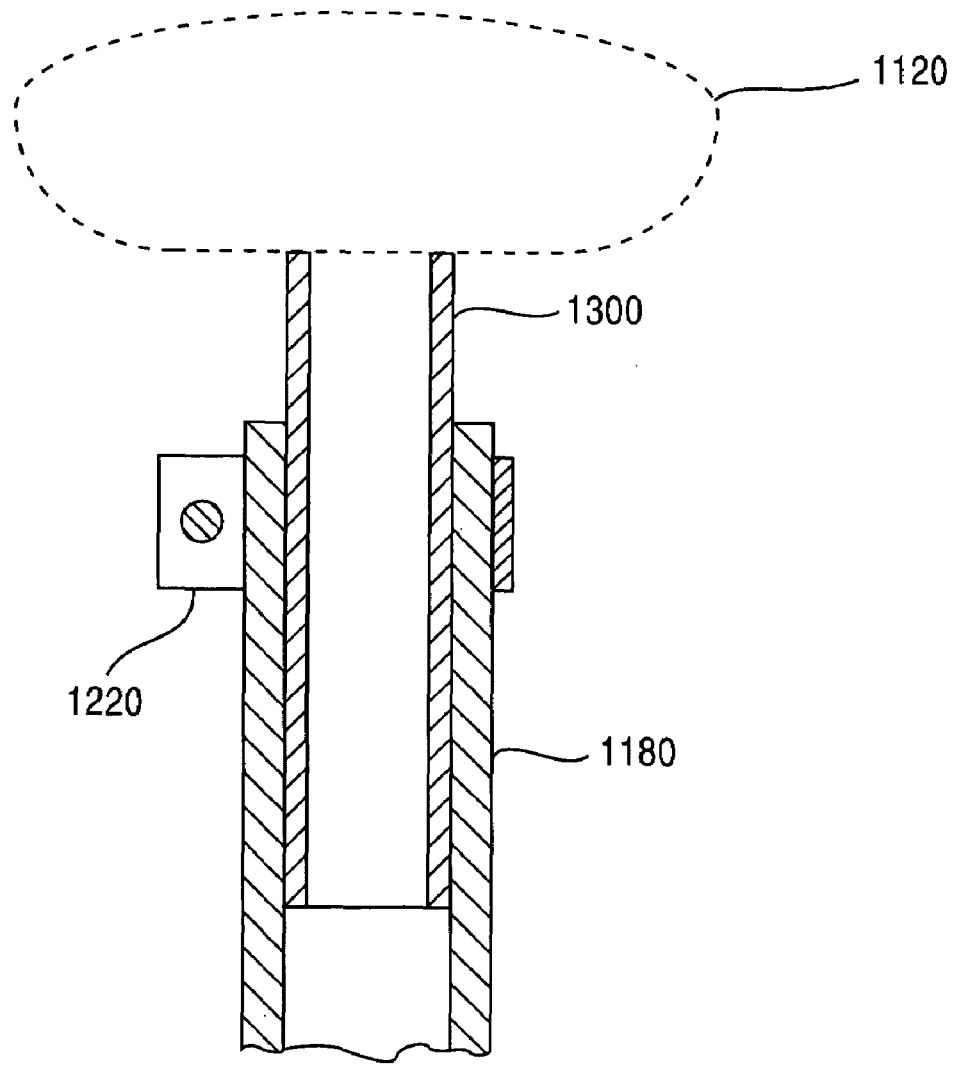
FIG. 20 is a cross sectional view of the seat post inserted into an upper end of the post member of the seat frame assembly.

Referring to FIG. 20, the seat 1120 includes a stem 1300 that is inserted into an upper end of the post member 1180, wherein an outer surface of the stem 1300 abuts an inner surface of the post member 1180. The upper clamp 1220 engages an outer circumferential surface of the post member 1180. When the upper clamp 1220 is tightened, a diameter of the post member 1180, about which the upper clamp 1220 is disposed, decreases, frictionally locking the stem 1300 at a position relative to the post member 1180. When the upper clamp 1220 is loosened, the stem 1300 is freely slideable within the post member 1180. Therefore, the seat 1120 is adjustable to different heights by loosening the upper clamp 1220, adjusting the height of the seat 1120, and retightening the upper clamp 1220. The upper clamp 1220 is preferably a quick-release seatpost collar used on conventional bicycles, but includes any structure, now in existence or hereafter developed, capable of imparting a clamping force onto an outer tube surface.

Figure 21:
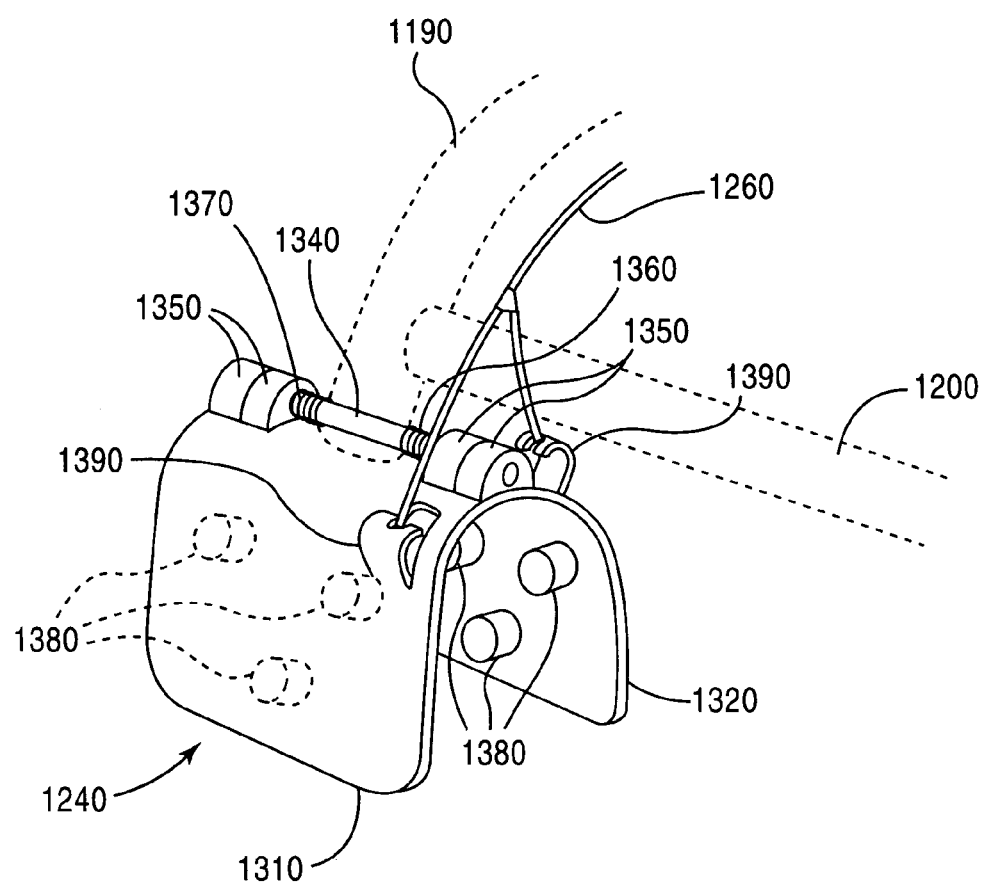
FIG. 21 is a perspective view of the spring loaded clamp of the seat frame assembly.

Referring to FIG. 21, the spring-loaded clamp 1240 includes a first engaging member 1310, a second engaging member 1320, springs 1330, and a hinge pin 1340. The hinge pin 1340 extends through retainers 1350, formed at an upper end of the first and second engaging members 1310 and 1320, and a lower end of the front member 1190. The hinge pin 1350 retains front and rear springs 1360 and 1370 between the retainers 1350 of the first and second engaging members 1310 and 1320. The front spring 1360 is forward of the front member 1190, while the rear spring 1370 is rearward of the front member 1190. Pins 1380 are formed on inner surfaces of the first and second engaging members 1310 and 1320 and freely extend inwards. Further, a grasping member 1390a and 1390b is formed on a corresponding upper surface of the first and second engaging members 1310 and 1320.

The release lever 1400 is affixed to a back surface of the post member 1180 proximate to the upper end of the front member 1190. The release cable 1260 extends from the release lever 1270 along the front member 1190 to the lower brace member 1200, where the release cable 1260 divides into a right and left end 1410 and 1420, respectively. The right and left ends 1410 and 1420 connect to the grasping members 1390a and 1390b, respectively. Therefore, when the release lever 1270 is actuated, the release cable 1260 is pulled, forcing the first and second engaging members 1310 and 1320 to retract, wherein the springs 1360 and 1370 are compressed. When the release lever 1270 is released, the release cable 1260 is slackened and the compressed springs 1360 and 1370 force the first and second engaging members 1310 and 1320 to close.

Again referring to FIG. 19, the front drive element 1150 attaches onto an outer surface of crank 1130, which is housed by and rotatable within the front tube portion 1280, similar to a conventional bicycle. Although illustrated as being attached on a right side of the crank 1130, it is within the scope of the present invention that the front drive element 1150 be attached to a left side of the crank 1130.

Figure 22:
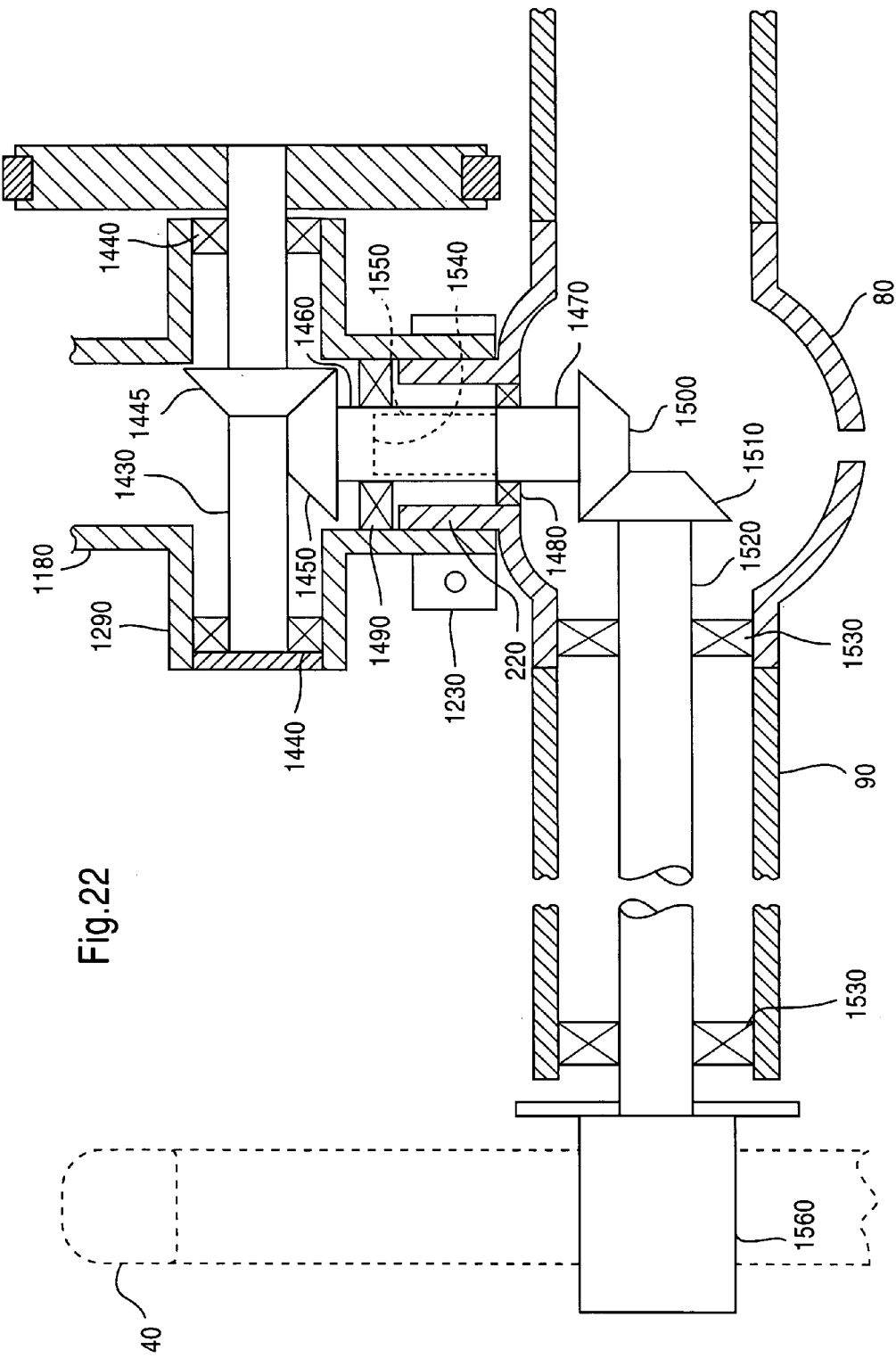
FIG. 22 is a cross-sectional view of shafts and gears of a drivetrain.

Referring to FIG. 22, the rear tube portion 1290 houses a first shaft 1430 extending therethrough and is supported by bearings 1440, as illustrated in FIG. 20. The rear drive element 1160 is attached to an outwardly extending end of the first shaft 1430. A first gear 1445 secures to a middle portion of the first shaft 1430 on an outer surface thereof.

In a preferred embodiment, the first gear 1445 is a bevel gear, which engages a second gear 1450, also preferably a bevel gear, that is oriented substantially coaxial with a longitudinal axis of the post member 1180. The second gear 1450 is joined to a second shaft 1460, which mates to a third shaft 1470. The third shaft 1470 is coaxial with the second shaft 1460 and is supported by a bearing 1480. The second shaft 1460 is supported within the post member 1180 by a bearing 1490. The third shaft 1470 includes a third gear 1500, which is also preferably a bevel gear. The third gear 1500 engages a fourth gear 1510, also preferably a bevel gear, provided on an end of a fourth shaft 1520. The fourth shaft 1520 extends through the left transverse member 90 and is coupled to the hub 1560 of the left rear wheel 40. The fourth shaft 1520 is supported within the transverse member 90b by bearings 1530 disposed near opposing ends of the fourth shaft 1520.

Figure 23:
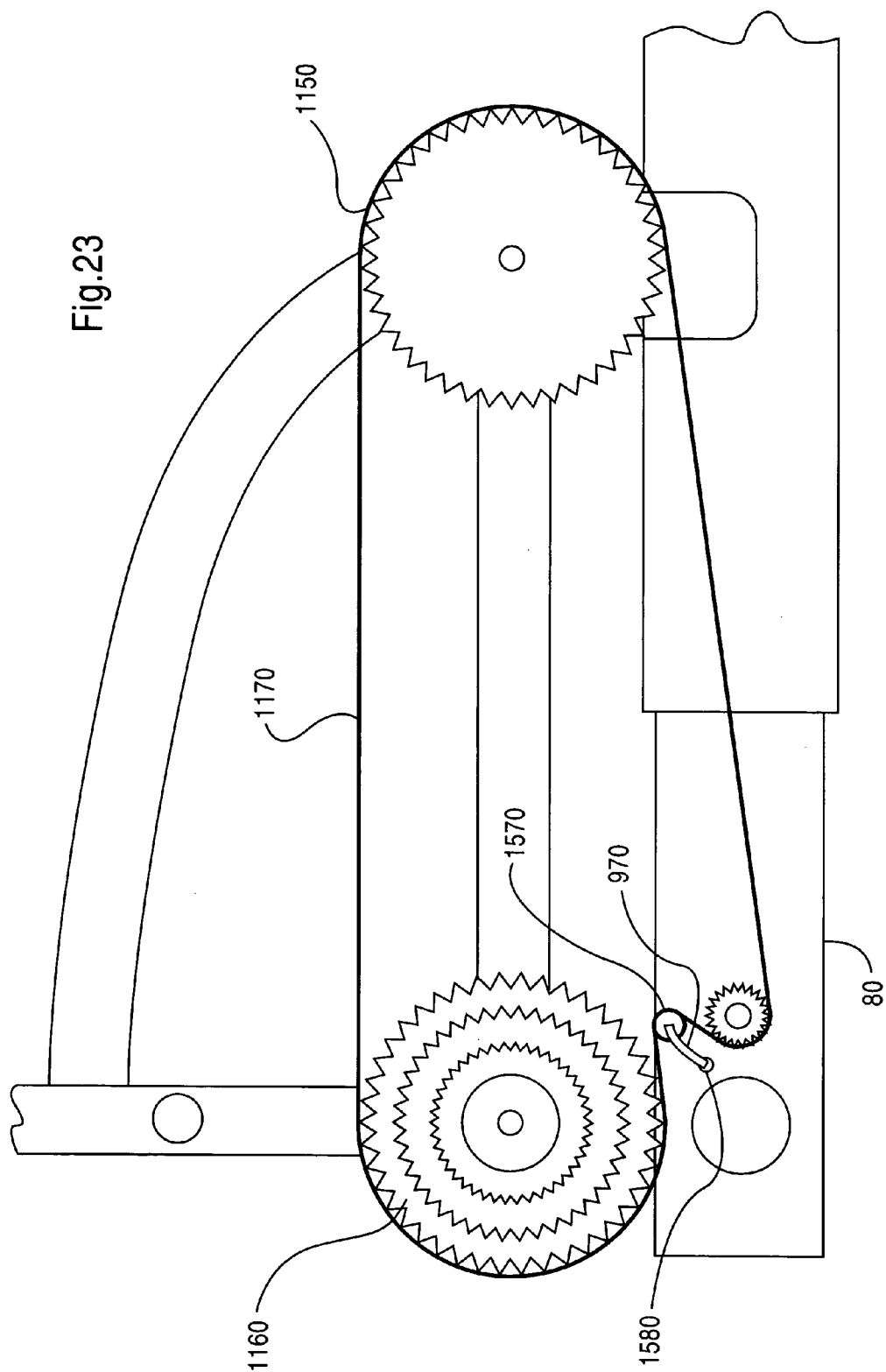
FIG. 23 is a side view of the drivetrain.

In a preferred embodiment, the front and rear drive elements 1150 and 1160 are pulleys, and the continuous drive element 1170 is a continuous belt. However, it is within the scope of the present invention that the front drive element 1150 be a chainring or chainring cassette comprising a plurality of chainrings of different sizes for changing gears, similar to those used in conventional bicycles. Similarly, it is within the scope of the present invention that the rear drive element 1160 be a chainring or a chainring cassette comprising a plurality of chainrings of different sizes for changing gears, also similar to those used in conventional bicycles, as shown in FIG. 23. Further, it is within the scope of the present invention that the continuous drive element 1170 be a continuous chain, similar to those used on conventional bicycles.

When the first and second telescoping members 70 and 70' and 80 and 80' are in a fully extended state, the seat frame assembly 115 is attachable to the frame 20. When attached, the pins 1380 on the first and second engaging members 1310 and 1320 are inserted into the aligned back openings 230 of the first telescoping member 70 and 70' and the front openings 240 of the second telescoping member 80 and 80'. Also, the U-shaped members 1250, provided on the right and left cross members 1210, engage an upper surface of the transverse members 90a and 90b. The right and left cross members 1210 distribute a portion of a rider's weight onto the left and right transverse members 90.

Additionally, an inner surface of the post member 1180 at a lower end thereof slides over an outer surface of the upwardly extending boss 220. Further, a splined extension 1540 of the third shaft 1470 inserts into a splined slot 1550 of the second shaft 1460. The lower clamp 1230, provided on an outer circumferential surface of the post member 1180, operates similarly to the upper clamp 1220. Therefore, when the seat frame assembly 115 slides onto the upwardly extending boss 220, the lower clamp 1230 is tightened, frictionally locking the frame assembly to the frame 20.

While the slot 1550 of the second shaft 1460 and the extension 1540 of the third shaft 1470 are described as being splined, it is within the scope of the invention that the slot 1550 and extension 1540 have any interlocking configuration, such as a square-shaped joint.

Once the seat frame assembly 115 is attached to the frame 20, a rider can propel the vehicle 10 forward by operating the pedals 1140. When the rider operates the pedals 1140, the crank 1130 and front drive element 1150, attached thereto, rotate in unison. The front drive element 1150 drives the continuous drive element 1170 causing the rear drive element 1160, the first shaft 1430, and the first gear 1440 to rotate. The first gear 1440 rotates the second gear 1450, which, in turn, spins the mated second and third shafts 1460 and 1470. Accordingly, the third gear 1500 rotates the fourth gear 1510 and the fourth shaft 1520 and, finally, the left rear wheel 40, propelling the vehicle 10 forward.

In a preferred embodiment, a hub 1560 of the driven rear wheel 40 is an internal gear hub, such as a Speehub® by Rohloff USA, Inc., 1327 Richmond Street, El Cerrito, Calif. 94530 or Nexus® internal gear hubs by Shimano American Corp., One Holland, Irvine, Calif. 92618. The internal gear hub provides a plurality of different gear ratios for changing a gear ratio of the driven rear wheel 30. A back end of the gear selector cable 910 attaches to the hub 1560 in a known manner. Therefore, the internal gears of the hub 1560 are selectable by actuating the gear selector 870 on the handlebar 730.

In an alternate embodiment, a rear derailleur, such as a rear derailleur used in conventional bicycle applications, is used to change gears of the vehicle 10. FIG. 23 illustrates a back portion of the vehicle 10, including the rear drive element 1160 and a rear derailleur 1570. In this embodiment, the front drive element 1150 is a chainring or chainring cassette, the rear drive element 1160 is a chainring cassette, and the continuous drive element 1170 is a continuous chain. The gear selector cable 970 exits the second telescoping member 80 and 80' through an opening 1580 and connects to the rear derailleur 1570. The rear derailleur changes the gearing of the vehicle in a known manner by moving the continuous drive element 1170 from one chainring of the rear drive element 1160 to another. Therefore, by using the rear derailleur 1570, the rear drive element 1160 provides for changing the gearing ratio of the driven rear wheel 40.

Child-Carrying Feature

Figure 24:
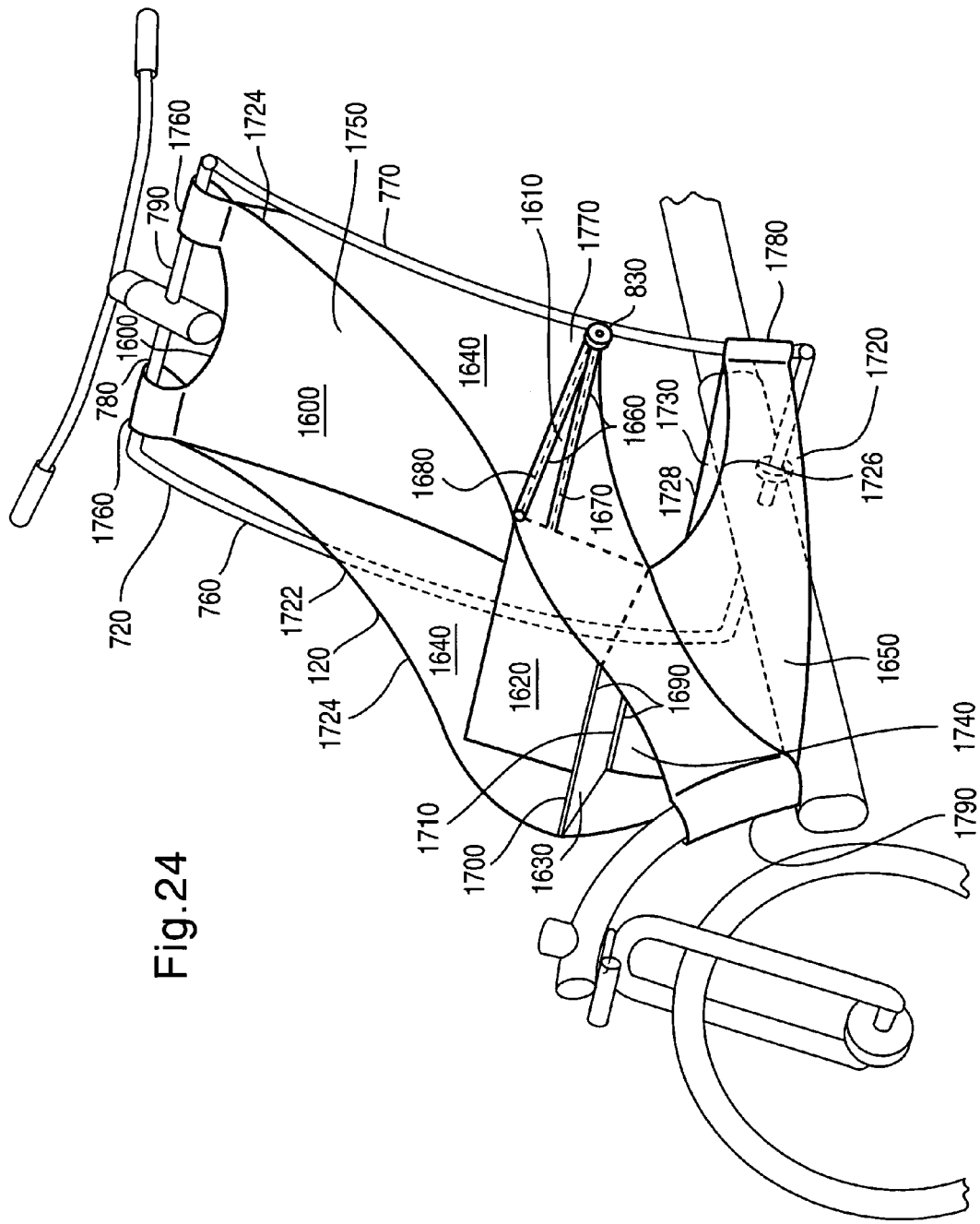
FIG. 24 is a perspective view of a child-carrying feature.

The vehicle further comprises a child-carrying feature 120 for transporting a small child. As illustrated in FIG. 24, the child-carrying feature 120 includes a back panel 1600, a seating panel 1610, a bridging panel 1620, a footrest panel 1630, side panels 1640, and a storage bin 1650. The seating panel 1610 includes rigid members 1660 along a back edge 1670 and along side edges 1680. Sides of the back panel 1600, the seating panel 1610, the bridging panel 1620, and the footrest panel 1630 fixably attach to the side panels 1640 along an inner surface thereof. Additionally, the footrest panel 1630 includes rigid members 1690 along front and rear edges 1700 and 1710. The storage bin 1650 attaches to lower edges of the side panels 1640 at a front portion thereof and includes sides 1720, a back 1730, a front 1740, and a bottom (not shown). In one embodiment, the child-carrying feature 120 is manufactured from a flexible material 1750, such as a durable woven fabric. However, it is within the scope of the invention that the material forming the child-carrying feature 120 be any suitable flexible material now in existence or hereafter created.

An upper end of the back panel 1600 attaches to the right and left upper members 780, 790 of the handlebar frame 720 via attaching portions 1760. Lower back corners 1770 of the side panels 1640 are also secured to the positioning mechanisms 830 of the handlebar frame 720. Attaching portions 1780 of the storage bin 1650, formed where the back 1730 meets the sides 1720, also attach to the right and left side members 760 and 770 of the handlebar frame 720. Further, an attaching portion 1790, formed where the side panels 1640 converge at a front end of the child-carrying feature 120, attaches to a lower portion of the support member 100.

Optionally, the child-carrying feature 120 can include an adjustment mechanism for reclining or inclining the back panel 1600, similar to the seat back recline feature disclosed in column 10, line 45 through column 11, line 62 of U.S. Pat. No. 5,590,896 issued to Eichhorn.

Figure 25:
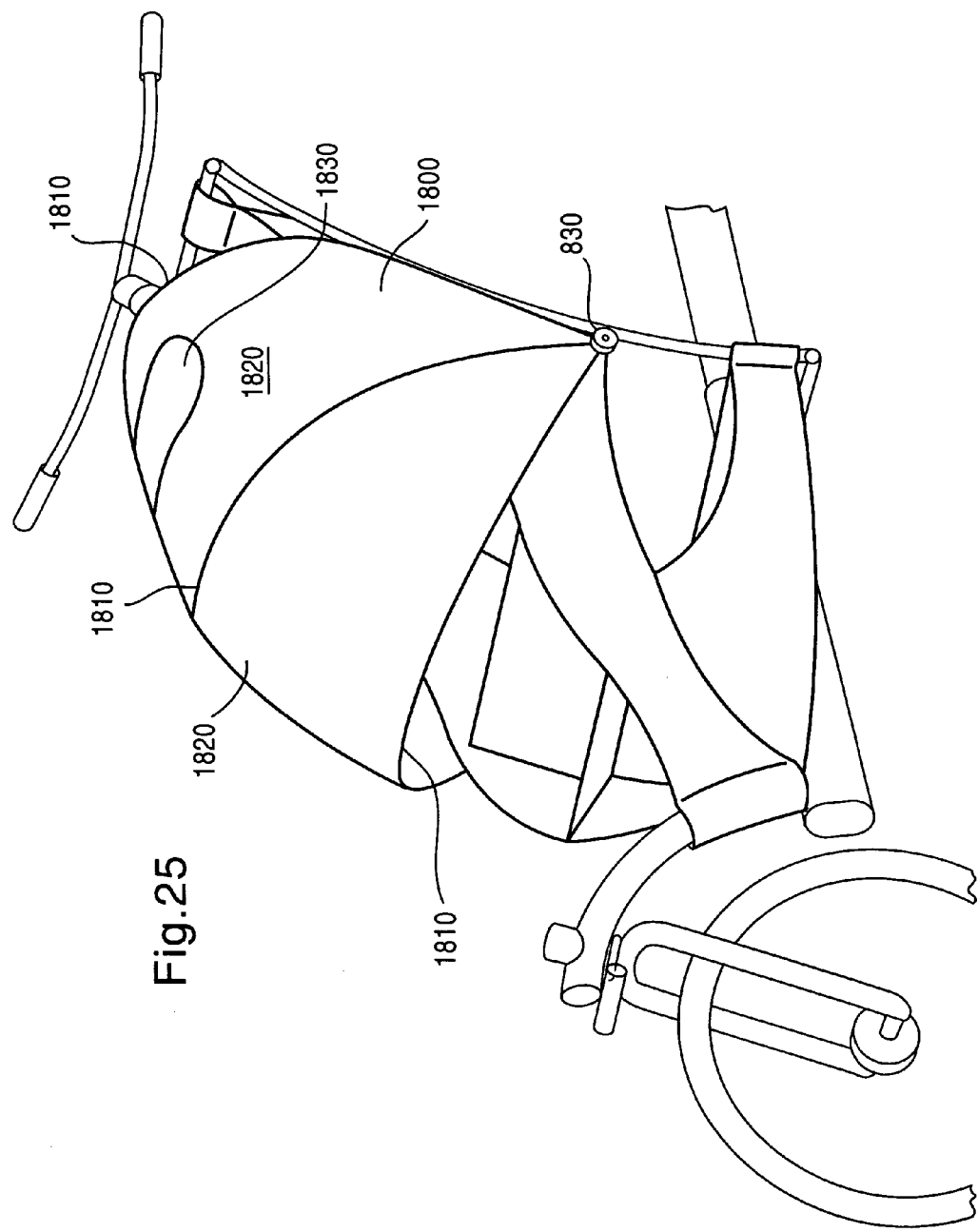
FIG. 25 illustrates a canopy of the child-carrying feature in a fully extended configuration.

The child-carrying feature 120 also includes a canopy 1800, illustrated in FIG. 25. The canopy 1800 may include a plurality of U-shaped members 1810 with a flexible material 1820 extending therebetween. Optionally, the canopy 1800 may include a window 1830 formed in a portion of the flexible material 1820. Preferably, the window 1830 would be manufactured from a transparent, flexible material that allows one to view an occupant seated in the child-carrying feature 120. It should be noted that even though the canopy is illustrated as having three U-shaped members 1810, it is within the scope of the present invention to include any number of U-shaped members 1810.

Figure 26:
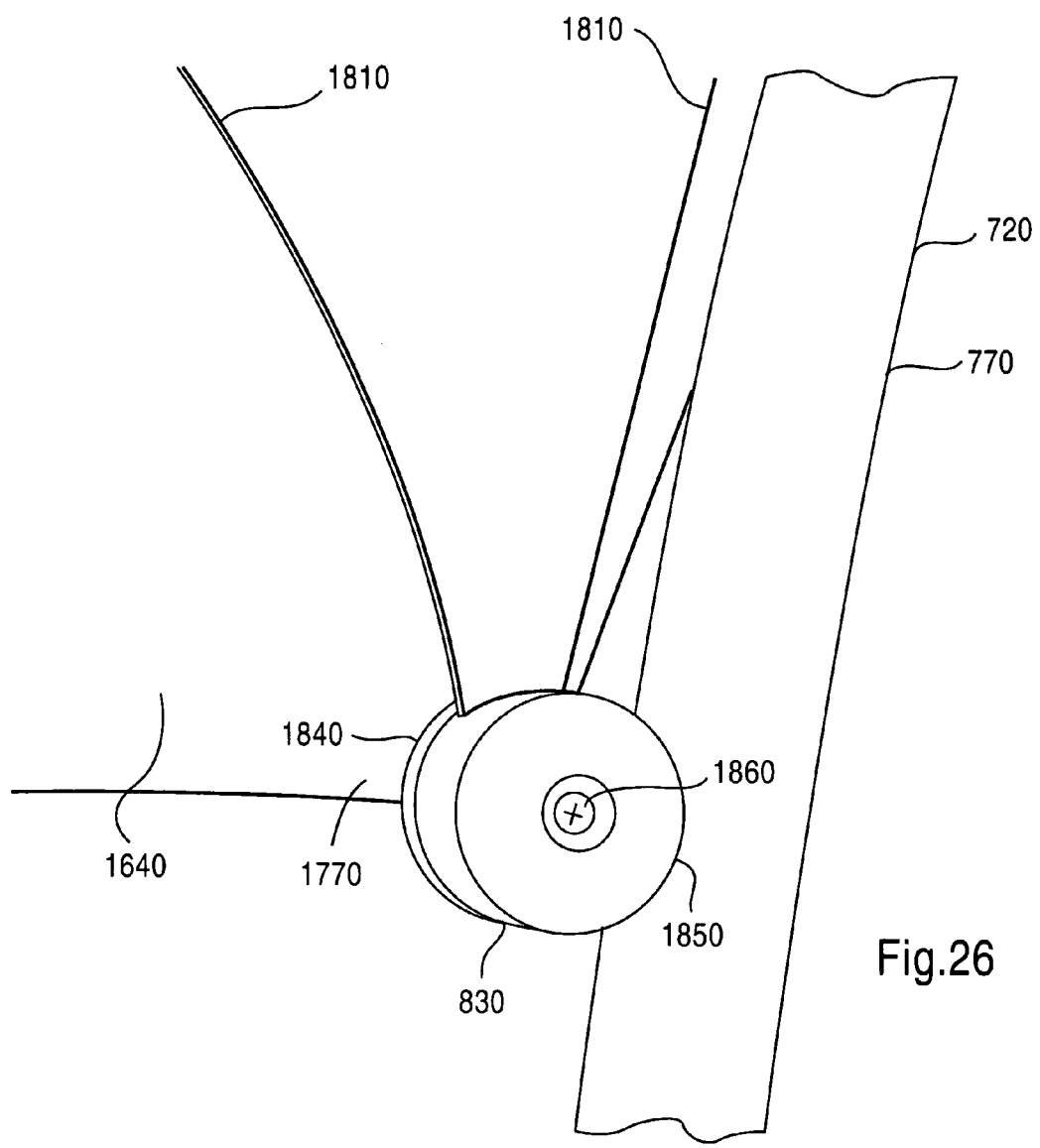
FIG. 26 illustrates a positioning mechanism for locking the canopy in an extended or retracted configuration.
Figure 27:
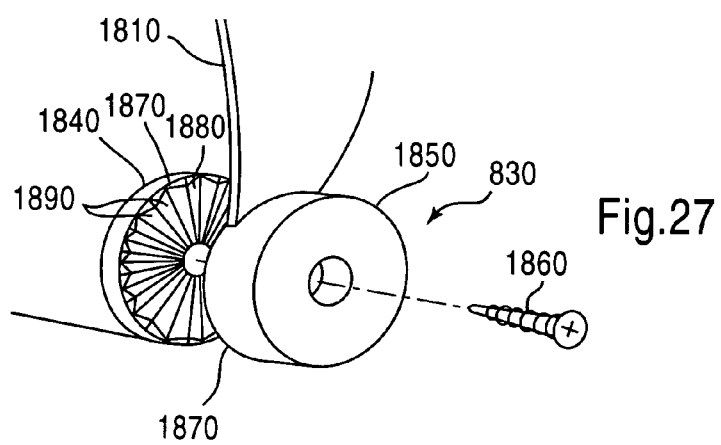
FIG. 27 is an exploded view of the positioning mechanism.

The canopy 1800 attaches to the positioning mechanism 830 of the handlebar frame 720. Referring to FIGS. 26 and 27, the positioning mechanism 830 includes an inner portion 1840 and an outer portion 1850, which are united with a fastener 1860, such as a screw or bolt. The outer portions 1850 of the positioning mechanisms 830 are rigidly attached to respective right and left vertical members 760 and 770 of the handlebar frame 720, but are rotatable thereon. The inner portions 1840 of the positioning mechanisms 830 are attached to the lower back corners 1770 of the side panels 1640 of the child-carrying feature 120. Mating inner surfaces 1870 of the inner and outer portions 1840, 1850 include a plurality of raised ridges 1880. The raised ridges 1880 of one of the inner surfaces 1870 are secured between the adjacent raised ridges 1880 of the mating inner surface 1870. However, adjacent sides 1890 forming the raised ridges 1880 have a sufficiently shallow slope, wherein the mating inner surfaces 1870 will rotate relative to each other when a sufficient moment is applied.

The rear-most U-shaped member 1810 is attached to the inner portions 1840 of the positioning mechanisms 830. The front-most U-shaped member 1810 is secured to the outer portions 1850 of the positioning mechanisms 830 and is rotatable therewith. The intermediate U-shaped member or members 1810 between the front-most and rear-most U-shaped members 1810 are secured to the flexible material 1820 and are not attached to the positioning mechanism 830. Therefore, the intermediate U-shaped members 1810 float between the front-most and the rear-most U-shaped members 1810. Accordingly, the canopy 1800 is extendable and retractable.

Figure 28A:
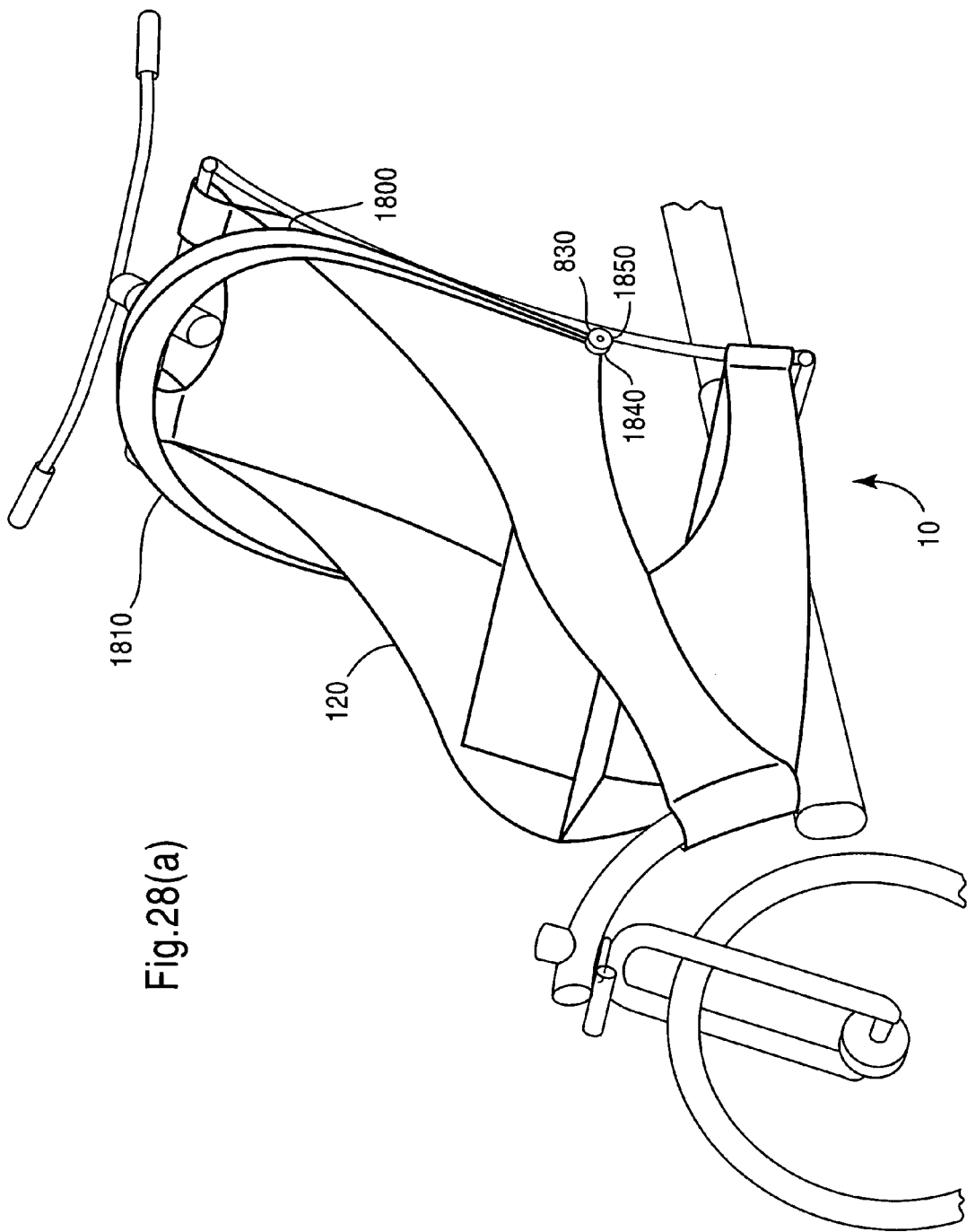
FIG. 28(a) shows the canopy in a fully retracted configuration.
Figure 28B:
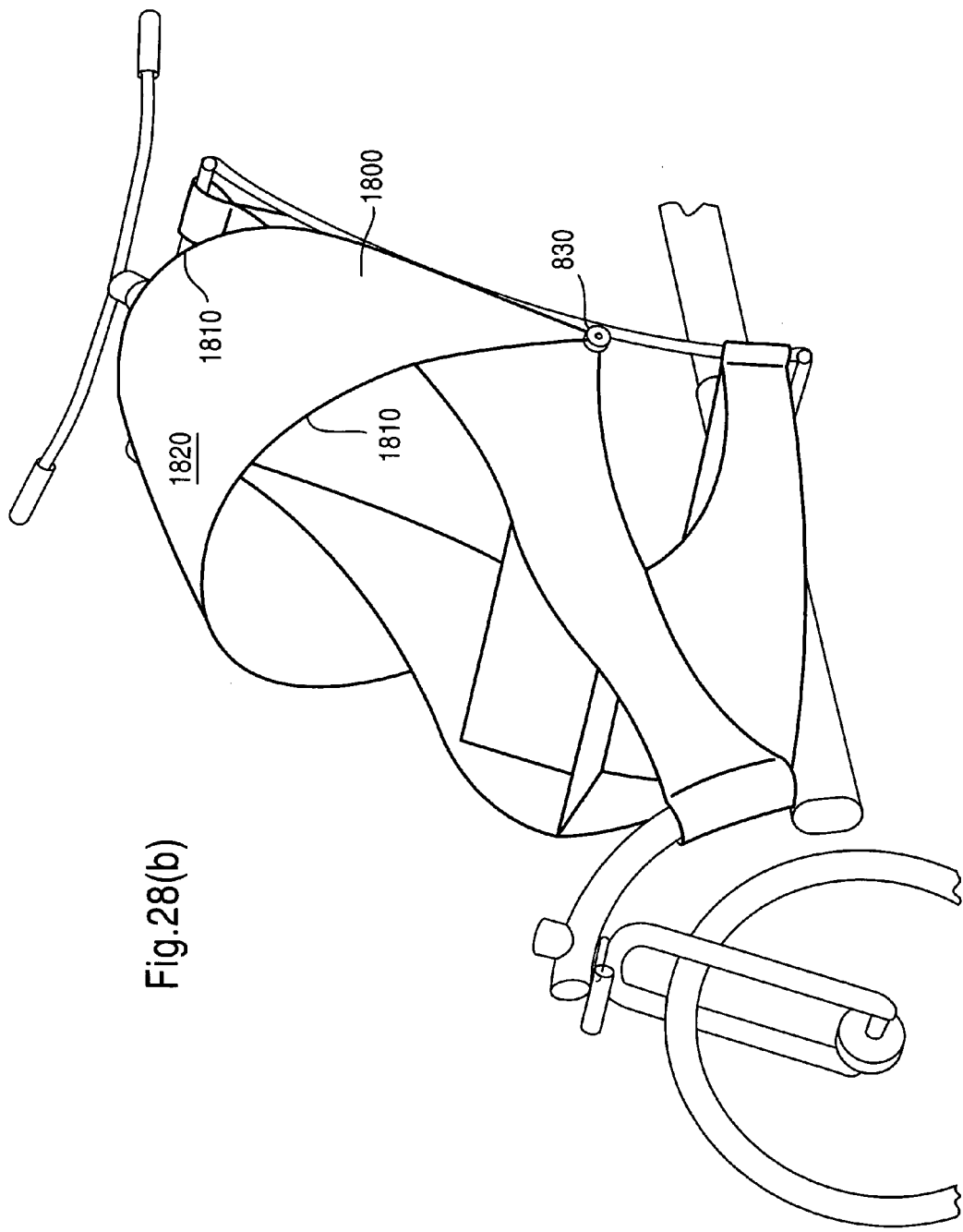
FIG. 28(b) shows the canopy in an intermediate extended configuration.

Operation of the canopy 1800 is illustrated in FIGS. 28(*a*) and 28(*b*). From a fully retracted position, the front U-shaped member 1810 is pulled forward, causing the outer portion 1850 of the positioning mechanism 830 to rotate relative to the inner portion 1840. Accordingly, a portion of the flexible material 1820 disposed between the front U-shaped member 1810 and the middle U-shaped member 1810 extends. As the front-most U-shaped member 1810 is pulled further, the flexible material 1820 between the front and middle U-shaped members 1810 becomes taught, urging the middle U-shaped member 1810 to move forward. If pulling is continued, the flexible material 1820 between the middle and back U-shaped members 1810 becomes taut and the canopy 1800 is fully extended. Moreover, it is an aspect of the present invention that the canopy 1800 be extendable to completely surround a torso of the rider in the child-carrying feature 120. To retract the canopy 1800, the operation is merely reversed, wherein the front U-shaped member 1810 is merely pushed towards the back U-shaped member 1810.

Figure 29:
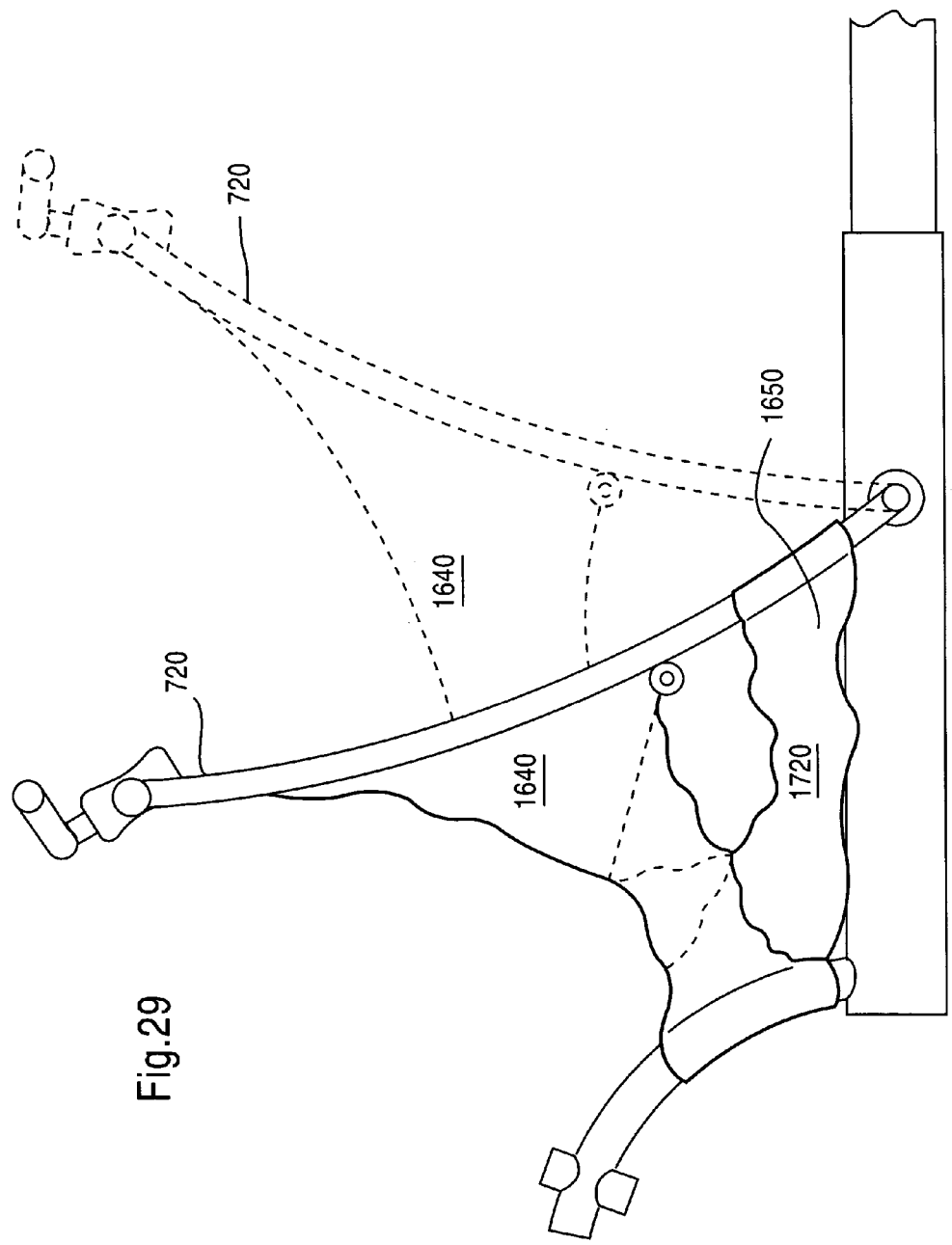
FIG. 29 is a schematic diagram illustrating the manner in which the child-carrying feature folds when the handlebar assembly pivots forward.

Referring to FIGS. 24 and 29, when the handlebar frame 720 is rotated upwards and locked into an upright position, the back panel 1600 and side panels 1640 are placed in tension. The sides 1720 and bottom of the storage bin 1650 are also placed in tension, and the sides 1720 of the storage bin 1650 pull the side panels 1640 downwards and back, further contributing to the tension therein. The rigid members 1690 force the side panels 1640 to extend outwardly. Accordingly, once fully extended, the child-carrying feature 120 is sufficiently rigid to allow a child to sit thereon.

Further, the child-carrying feature 120 can optionally include a flexible or semi-rigid element 1722, such as a cable, rope, or twine incorporated into upper edges 1724 of the side panels 1640, upper edges 1726 of the sides 1720 of the storage bin 1650, and an upper edge 1728 of the back 1730 of the storage bin 1650. The flexible element 1722 provides added strength and rigidity to the child-carrying feature 120 when fully extended.

Prior to rotating the handlebar frame 720 forward, the canopy 1800 is first fully retracted, as described above. Thereafter, the handlebar frame 720 is rotated forward, causing the panels 1600, 1610, 1620, 1630, and 1640 and the storage bin 1650 to slacken. As the handlebar frame 720 continues to rotate forward, the flexible material folds randomly over itself except in those locations reinforced by the rigid members 1690. When the handlebar frame 720 is fully rotated forward, the child-carrying feature 120 resides in a flat, compact configuration.

While there has been described what are at present considered to be preferred embodiments of the present invention, it will be understood that various modifications may be made thereto, and it is intended that the appended claims cover all such modifications as fall within the true spirit and scope of the invention. Other modifications will be apparent to those skilled in the art.

What is claimed is:

1. A vehicle for pushing or riding, the vehicle comprising:
    a frame,
    at least one front wheel operationally connected to a first end of the frame; and
    at least one rear wheel operationally connected to a second end of the frame opposite the first end,
    wherein the frame includes at least one inner member nested within an outer member, and an intermediate member nested within the outer member, the intermediate member being disposed between the outer member and the at least one inner member, the at least one inner member being nested within the intermediate member, wherein the at least one inner member and the intermediate member telescopingly extend from and retract into the outer member, wherein the frame is extendable to be user-rideable, and wherein the frame is retractable to be user-pushable.

2. The vehicle of claim 1, wherein the vehicle is operable as a user-rideable vehicle when the at least one inner member is in a fully extended state and is operable as a user-pushable vehicle when the at least one inner member is in a fully retracted state.

3. The vehicle of claim 2, wherein the vehicle further comprises a detachable seat frame, wherein the seat frame is attachable to the frame when the at least one inner member is in the fully extended state.

4. The vehicle according to claim 2, wherein the at least one inner member is lockable in either one of the fully extended state or the fully retracted state.

5. The vehicle according to claim 2, wherein the first end of the frame is rotatably connected to a collar disposed at a first end of the outer member, and wherein the first end of the frame is rotatable between one of a vertical orientation and a horizontal orientation relative to the frame.

6. The vehicle according to claim 2, wherein the frame includes at least one stopping mechanism included on one of an upper portion and lower portion of the outer member and a corresponding upper portion or lower portion of the at least one inner member to place the at least one inner member in either one of the fully extended state or the fully retracted state.

7. The vehicle according to claim 2, wherein the at least one inner member comprises a first inner member nested within a second inner member, wherein the second inner member is the intermediate member and is telescopingly extendable from the outer member and the first inner member is telescopingly extendable from within the second inner member.

8. The vehicle according to claim 3, wherein the seat frame includes a releasable securing member for securing the seat frame to the frame, and wherein the securing member engages the at least one inner member when the at least one inner member is in the fully extended state.

9. The vehicle according to claim 8, wherein the seat frame further comprises a drivetrain, which powers the vehicle and comprises at least one pulley, at least one belt, and at least one gear operationally connected to each other to power the vehicle.

10. The vehicle according to claim 8, wherein the seat frame further comprises a drivetrain which powers the vehicle and comprises at least one chainring, at least one chain, and at least one gear operationally connected to each other to power the vehicle.

11. The vehicle according to claim 8, wherein the vehicle further comprises a handlebar frame pivotably attached to the frame, wherein the handlebar frame includes a handlebar steerably connected to a front frame member pivotably attached to the first end of the frame, wherein the at least one front wheel is rotatably attached to the front frame member, and wherein the front frame member and front wheel pivot when the handlebar pivots relative to the frame for steering the vehicle.

12. The vehicle according to claim 11, wherein the handlebar is steerably connected to the front frame member by a first cable and a second cable extending between a first flange securably attached to the handlebar and rotatable therewith and a second flange securably attached to the front frame member and rotatable therewith, wherein the first cable is slackened and the second cable is pulled when the handlebar is rotated in a first direction to steer the vehicle in the first direction, and wherein the first cable is pulled and the second cable is slackened when the handlebar is rotated in a second direction to steer the vehicle in the second direction.

13. The vehicle according to claim 11, wherein the handlebar frame further comprises:
    a control device for actuating at least one of a front brake and back brake; and
    a gear adjustor which changes a gear ratio of a drivetrain which powers the vehicle.

14. The vehicle according to claim 11, wherein the vehicle further comprises a child carrier disposed between the handlebar frame and the first end of the frame.

15. The vehicle according to claim 11, wherein the handlebar frame further comprises a locking mechanism to releasably lock the handlebar frame to the frame in an upright orientation relative to a longitudinal axis of the frame.

16. The vehicle according to claim 13, wherein the drivetrain includes an internal gear hub, and wherein the gear adjustor communicates with the internal gear hub to change the gear ratio of the drivetrain.

17. The vehicle according to claim 13, wherein the drivetrain includes a derailleur, and wherein the gear adjustor communicates with the derailleur to change the gear ratio of the drivetrain.

18. The vehicle according to claim 14, wherein the child carrier folds when the handlebar frame pivots on the frame in a direction towards the first end of the frame.

19. The vehicle according to claim 18, wherein the child carrier comprises an adjustable canopy extendable over the child carrier.

20. The vehicle according to claim 6, wherein the at least one stopping mechanism comprises a pin extending from one of the upper portion or the lower portion of the outer member, the pin being slideable within a slot formed in the corresponding upper portion or the lower portion of the at least one inner member, wherein the pin engages a first edge of the at least one inner member defining a first end portion of the slot to place the at least one inner member in the fully extended state, and wherein the pin engages a second edge of the at least one inner member defining a second end portion of the slot opposite the first edge to place the at least one inner member in the fully retracted state.

21. The vehicle according to claim 6, wherein the at least one stopping mechanism comprises:
 a longitudinal ridge formed in one of the upper portion and the lower portion of the outer member nested within a longitudinal ridge formed in the corresponding upper portion or lower portion of the at least one inner member, wherein the longitudinal ridge of the outer member and the longitudinal ridge of the at least one inner member are slideable over each other;
 a first and second engaging pin extending from the longitudinal ridge of the at least one inner member at a respective front end and a back end thereof; and
 an engaging pin extending from a back end of the longitudinal ridge of the outer member, wherein the first engaging pin of the at least one inner member engages the engaging pin of the outer member when the at least one inner member is in the fully extended state, and wherein the second engaging pin of the at least one inner member engages the engaging pin of the outer member when the at least one inner member is in the fully retracted state.

22. A vehicle for pushing or riding, the vehicle comprising:
 a frame,
 at least one front wheel operationally connected to a first end of the frame;
 at least one rear wheel operationally connected to a second end of the frame opposite the first end; and
 a detachable seat frame directly attachable to an outer member of the frame, wherein the seat frame includes a drivetrain which powers the vehicle and comprises at least one pulley, at least one belt, and at least one gear operationally connected to each other to power the vehicle,
 wherein the frame is extendable to be a user-rideable vehicle when the frame is in a fully extended state, and wherein the frame is retractable to be user-pushable when the frame is in a fully retracted state.

23. The vehicle of claim 22, wherein the frame includes at least one inner member nested within the outer member, wherein the at least one inner member telescopingly extends from and retracts into the outer member; and wherein the vehicle is operable as a user-rideable vehicle when the at least one inner member is in a fully extended state and is operable as a user-pushable vehicle when the at least one inner member is in a fully retracted state.

24. The vehicle of claim 23, wherein the seat frame is attachable to the frame when the at least one inner member is in the fully extended state.

25. The vehicle according to claim 23, wherein the at least one inner member is lockable in either one of the fully extended state or the fully retracted state.

26. The vehicle according to claim 23, wherein the first end of the frame is rotatably connected to a collar disposed at a first end of the outer member, and wherein the first end of the frame is rotatable between one of a vertical orientation and a horizontal orientation relative to the frame.

27. The vehicle according to claim 23, wherein the frame includes at least one stopping mechanism included on one of an upper portion and lower portion of the outer member and a corresponding upper portion or lower portion of the at least one inner member to place the at least one inner member in either one of the fully extended state or the fully retracted state.

28. The vehicle according to claim 23, wherein the at least one inner member comprises a first inner member nested within a second inner member, wherein the second inner member is telescopingly extendable from the outer member and the first inner member is telescopingly extendable from within the second inner member.

29. The vehicle according to claim 24, wherein the seat frame includes a releasable securing member for securing the seat frame to the frame, and wherein the securing member engages the at least one inner member when the at least one inner member is in the fully extended state.

30. The vehicle according to claim 29, wherein the drivetrain further comprises at least one chainring, at least one chain, and the at least one gear operationally connected to each other to power the vehicle.

31. The vehicle according to claim 29, wherein the vehicle further comprises a handlebar frame pivotably attached to the frame, wherein the handlebar frame includes a handlebar steerably connected to a front frame member pivotably attached to the first end of the frame, wherein the at least one front wheel is rotatably attached to the front frame member, and wherein the front frame member and front wheel pivot when the handlebar pivots relative to the frame for steering the vehicle.

32. The vehicle according to claim 31, wherein the handlebar is steerably connected to the front frame member by a first cable and a second cable extending between a first flange securably attached to the handlebar and rotatable therewith and a second flange securably attached to the front frame member and rotatable therewith, wherein the first cable is slackened and the second cable is pulled when the handlebar is rotated in a first direction to steer the vehicle in the first direction, and wherein the first cable is pulled and the second cable is slackened when the handlebar is rotated in a second direction to steer the vehicle in the second direction.

33. The vehicle according to claim 31, wherein the handlebar frame further comprises:
 a control device for actuating at least one of a front brake and back brake; and
 a gear adjustor which changes a gear ratio of a drivetrain which powers the vehicle.

34. The vehicle according to claim 31, wherein the vehicle further comprises a child carrier disposed between the handlebar frame and the first end of the frame.

35. The vehicle according to claim 31, wherein the handlebar frame further comprises a locking mechanism to releasably lock the handlebar frame to the frame in an upright orientation relative to a longitudinal axis of the frame.

36. The vehicle according to claim 33, wherein the drivetrain includes an internal gear hub, and wherein the gear adjustor communicates with the internal gear hub to change the gear ratio of the drivetrain.

37. The vehicle according to claim 33, wherein the drivetrain includes a derailleur, and wherein the gear adjustor communicates with the derailleur to change the gear ratio of the drivetrain.

38. The vehicle according to claim 34, wherein the child carrier folds when the handlebar frame pivots on the frame in a direction towards the first end of the frame.

39. The vehicle according to claim 38, wherein the child carrier comprises an adjustable canopy extendable over the child carrier.

40. The vehicle according to claim 27, wherein the at least one stopping mechanism comprises a pin extending from one of the upper portion or the lower portion of the outer member, the pin being slideable within a slot formed in the corresponding upper portion or the lower portion of the at least one inner member, wherein the pin engages a first edge of the at least one inner member defining a first end portion of the slot to place the at least one inner member in the fully extended state, and wherein the pin engages a second edge of the at least one inner member defining a second end portion of the slot opposite the first edge to place the at least one inner member in the fully retracted state.

41. The vehicle according to claim 27, wherein the at least one stopping mechanism comprises:
- a longitudinal ridge formed in one of the upper portion and the lower portion of the outer member nested within a longitudinal ridge formed in the corresponding upper portion or lower portion of the at least one inner member, wherein the longitudinal ridge of the outer member and the longitudinal ridge of the at least one inner member are slideable over each other;
- a first and second engaging pin extending from the longitudinal ridge of the at least one inner member at a respective front end and a back end thereof; and
- an engaging pin extending from a back end of the longitudinal ridge of the outer member, wherein the first engaging pin of the at least one inner member engages the engaging pin of the outer member when the at least one inner member is in the fully extended state, and wherein the second engaging pin of the at least one inner member engages the engaging pin of the outer member when the at least one inner member is in the fully retracted state.

42. A vehicle for pushing or riding, the vehicle comprising:
- a frame,
- at least one front wheel operationally connected to a first end of the frame; and
- at least one rear wheel operationally connected to a second end of the frame opposite the first end,
- wherein the frame includes at least one inner member nested within an outer member,
- wherein the at least one inner member telescopingly extends from and retracts into the outer member,
- wherein the vehicle is operable as a user-rideable vehicle when the at least one inner member is in a fully extended state and is operable as a user-pushable vehicle when the at least one inner member is in a fully retracted state,
- wherein the frame includes at least one stopping mechanism included on one of an upper portion and lower portion of the outer member and a corresponding upper portion or lower portion of the at least one inner member to place the at least one inner member in either one of the fully extended state or the fully retracted state, and
- wherein the at least one stopping mechanism comprises:
  - a longitudinal ridge formed in one of the upper portion and the lower portion of the outer member nested within a longitudinal ridge formed in the corresponding upper portion or lower portion of the at least one inner member, wherein the longitudinal ridge of the outer member and the longitudinal ridge of the at least one inner member are slideable over each other;
  - a first and second engaging pin extending from the longitudinal ridge of the at least one inner member at a respective front end and a back end thereof; and
  - an engaging pin extending from a back end of the longitudinal ridge of the outer member, wherein the first engaging pin of the at least one inner member engages the engaging pin of the outer member when the at least one inner member is in the fully extended state, and wherein the second engaging pin of the at least one inner member engages the engaging pin of the outer member when the at least one inner member is in the fully retracted state.

43. The vehicle of claim 42, wherein the vehicle further comprises a detachable seat frame, wherein the seat frame is attachable to the frame when the at least one inner member is in the fully extended state.

44. The vehicle according to claim 42, wherein the at least one inner member is lockable in either one of the fully extended state or the fully retracted state.

45. The vehicle according to claim 42, wherein the first end of the frame is rotatably connected to a collar disposed at a first end of the outer member, and wherein the first end of the frame is rotatable between one of a vertical orientation and a horizontal orientation relative to the frame.

46. The vehicle according to claim 42, wherein the at least one stopping mechanism comprises a pin extending from one of the upper portion or the lower portion of the outer member, the pin being slideable within a slot formed in the corresponding upper portion or the lower portion of the at least one inner member, wherein the pin engages a first edge of the at least one inner member defining a first end portion of the slot to place the at least one inner member in the fully extended state, and wherein the pin engages a second edge of the at least one inner member defining a second end portion of the slot opposite the first edge to place the at least one inner member in the fully retracted state.

47. The vehicle according to claim 42, wherein the at least one inner member comprises a first inner member nested within a second inner member, wherein the second inner member is telescopingly extendable from the outer member and the first inner member is telescopingly extendable from within the second inner member.

48. The vehicle according to claim 43, wherein the seat frame includes a releasable securing member for securing the seat frame to the frame, and wherein the securing member engages the at least one inner member when the at least one inner member is in the fully extended state.

49. The vehicle according to claim 48, wherein the vehicle further comprises a handlebar frame pivotably attached to the frame, wherein the handlebar frame includes a handlebar steerably connected to a front frame member pivotably attached to the first end of the frame, wherein the at least one front wheel is rotatably attached to the front frame member, and wherein the front frame member and front wheel pivot when the handlebar pivots relative to the frame for steering the vehicle.

50. The vehicle according to claim 49, wherein the handlebar is steerably connected to the front frame member by a first cable and a second cable extending between a first flange securably attached to the handlebar and rotatable therewith and a second flange securably attached to the front frame member and rotatable therewith, wherein the first cable is slackened and the second cable is pulled when the handlebar is rotated in a first direction to steer the vehicle in the first direction, and wherein the first cable is pulled and the second cable is slackened when the handlebar is rotated in a second direction to steer the vehicle in the second direction.

51. The vehicle according to claim 49, wherein the handlebar frame further comprises:
    a control device for actuating at least one of a front brake and back brake; and
    a gear adjustor which changes a gear ratio of a drivetrain which powers the vehicle.

52. The vehicle according to claim 49, wherein the vehicle further comprises a child carrier disposed between the handlebar frame and the first end of the frame.

53. The vehicle according to claim 45, wherein the handlebar frame further comprises a locking mechanism to releasably lock the handlebar frame to the frame in an upright orientation relative to a longitudinal axis of the frame.

54. The vehicle according to claim 51, wherein the drivetrain includes an internal gear hub, and wherein the gear adjustor communicates with the internal gear hub to change the gear ratio of the drivetrain.

55. The vehicle according to claim 51, wherein the drivetrain includes a derailleur, and wherein the gear adjustor communicates with the derailleur to change the gear ratio of the drivetrain.

56. The vehicle according to claim 52, wherein in the child carrier folds when the handlebar frame pivots on the frame in a direction towards the first end of the frame.

57. The vehicle according to claim 56, wherein the child carrier comprises an adjustable canopy extendable over the child carrier.

* * * * *